US010251047B2

(12) United States Patent
Karampatsis et al.

(10) Patent No.: US 10,251,047 B2
(45) Date of Patent: Apr. 2, 2019

(54) METHODS FOR RESTRICTED DIRECT DISCOVERY

(71) Applicant: INTERDIGITAL PATENT HOLDINGS, INC., Wilmington, DE (US)

(72) Inventors: Dimitrios Karampatsis, Middlesex (GB); Mahmoud Watfa, Saint Leonard (CA); Ulises Olvera-Hernandez, Montreal (CA); Saad Ahmad, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 206 days.

(21) Appl. No.: 14/874,093

(22) Filed: Oct. 2, 2015

(65) Prior Publication Data

US 2016/0100305 A1    Apr. 7, 2016

Related U.S. Application Data

(60) Provisional application No. 62/059,650, filed on Oct. 3, 2014, provisional application No. 62/103,925, filed on Jan. 15, 2015.

(51) Int. Cl.
*H04W 4/02* (2018.01)
*H04L 29/06* (2006.01)
(Continued)

(52) U.S. Cl.
CPC ............. *H04W 8/005* (2013.01); *H04L 63/08* (2013.01); *H04W 4/023* (2013.01); *H04L 67/16* (2013.01);
(Continued)

(58) Field of Classification Search
CPC ..... H04W 8/005; H04W 12/06; H04W 4/005; H04W 4/008; H04W 76/023; H04W 4/80;
(Continued)

(56) References Cited

U.S. PATENT DOCUMENTS

2016/0088668 A1* 3/2016 Kim .................... H04W 76/023
                                                       370/315
2016/0302062 A1* 10/2016 Lehtovirta ............ H04W 8/005

FOREIGN PATENT DOCUMENTS

WO    2013/163634 A1    10/2013

OTHER PUBLICATIONS

Qualcomm; "General principle for ProSe Restricted Discovery;" S2-142815; Jul. 11, 2014.*
(Continued)

*Primary Examiner* — Marsha D Banks Harold
*Assistant Examiner* — Elton Williams
(74) *Attorney, Agent, or Firm* — Volpe and Koenig, P.C.

(57) ABSTRACT

Techniques may be used for restricted direct discovery in proximity services (ProSe). A ProSe function may receive from a discovery wireless transmit/receive unit (WTRU) a restricted ProSe Application identity (ID) of an application located at the discoverer WTRU requesting ProSe discovery. The ProSe function may derive a first and second ProSe codes for the discoveree WTRU and discoverer WTRU, and provide the ProSe codes to the discoverer and/or discoveree WTRUs. A ProSe application server may receive a revocation message from an announcing WTRU indicating a revoked WTRU. The ProSe application server may provide a ProSe discovery WTRU ID for the revoked WTRU to a ProSe Function. The ProSe function may instruct the announcing WTRU to stop announcing a ProSe code known
(Continued)

by the revoked WTRU, and may provide a new ProSe code to at least one WTRU authorized to discover the announcing WTRU.

11 Claims, 18 Drawing Sheets

(51) Int. Cl.
| | |
|---|---|
| H04L 29/08 | (2006.01) |
| H04W 12/02 | (2009.01) |
| H04W 12/06 | (2009.01) |
| H04W 76/14 | (2018.01) |
| H04W 84/04 | (2009.01) |
| H04W 8/00 | (2009.01) |

(52) U.S. Cl.
CPC ............ *H04W 12/02* (2013.01); *H04W 12/06* (2013.01); *H04W 76/14* (2018.02); *H04W 84/042* (2013.01)

(58) Field of Classification Search
CPC .......... H04W 4/70; H04L 63/08; H04L 67/16; Y02D 70/21; H04M 15/93
See application file for complete search history.

(56) References Cited

OTHER PUBLICATIONS

Third Generation Partnership Project, "Technical Specification Group Core Network and Terminals; Proximity-services (ProSe) User Equipment (UE) to ProSe function protocol aspects; Stage 3 (Release 12)," 3GPP TS 24.334 V12.0.0 (Sep. 2014).
Third Generation Partnership Project, "Technical Specification Group Core Network and Terminals; Proximity-services (ProSe) User Equipment (UE) to ProSe function protocol aspects; Stage 3 (Release 12)," 3GPP TS 24.334 V12.4.0 (Sep. 2015).
Third Generation Partnership Project, "Technical Specification Group Core Network and Terminals; Proximity-services (ProSe) User Equipment (UE) to ProSe function protocol aspects; Stage 3 (Release 13)," 3GPP TS 24.334 V13.1.0 (Sep. 2015).
Catt, "Discussion on IDC for Dual Connectivity," 3GPP TSG RAN WG2 Meeting #87bis, R2-144365, Shanghai, China (Oct. 6-10, 2014).
Ericsson, "Introduction of dual connectivity in MAC (Option 2)," 3GPP TSG-RAN2 Meeting #87bis, R2-144701, Shanghai, China (Oct. 6-10, 2014).
Huawei et al., "ProSe Direct Discovery," SA WG2 Meeting #97, S2-132286, Busan, South Korea (May 27-31, 2013).
Huawei et al., "Restricted Discovery Update Procedure for triggered over PC2," 3GPP TSG SA WG2 Meeting #107, S2-150278, Sorrento, Italy (Jan. 26-30, 2015).
Intel, "Correction to PDN Deactivation for SIPTO@LN," SA WG2 Meeting #96, S2-131149, San Diego, USA (Apr. 8-12, 2013).
Interdigital et al., "Restricted ProSe Direct Discovery Model B procedures," SA WG2 Meeting #109, S2-151802, Fukuoka, Japan (May 25-29, 2015).
Interdigital, "Revocation of Restricted Discovery Permission over PC2," SA WG2 Meeting #107, S2-150196, Sorrento, Italy (Jan. 26-30, 2015).
Motorola Mobility, "ProSe Solution for direct discovery," 3GPP TSG SA WG2 Meeting #96, S2-131429, San Diego, USA (Apr. 8-12, 2013).
Qualcomm Incorporated, "Restricted ProSe Direct Discovery Model A procedures," SA WG2 Meeting #109, S2-152001, Fukuoka, Japan (May 25-29, 2015).
Qualcomm Incorporated, "Solution for direct discovery and communication," SA WG2 Meeting #96, S2-131505, San Diego, USA (Apr. 8-12, 2013).
Telecom Italia et al., "Direct Discovery update—open discovery," 3GPP TSG SA WG2 Meeting #110, S2-152606, Dubrovnik, Croatia (Jul. 6-10, 2015).
Telecom Italia et al., "Restricted Discovery Authorization Update," SA WG2 Meeting #107, S2-150599, Sorrento, Italy (Jan. 26-30, 2015).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.18.0 (Mar. 2013).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.15.0 (Mar. 2013).
Third Generation Partnership Project, "Technical Specification Group Services and System Aspects; General Packet Radio Service (GPRS) enhancements for Evolved Universal Terrestrial Radio Access Network (E-UTRAN) access (Release 13)," 3GPP TS 23.401 V13.4.0 (Sep. 2015).
Third Generation Partnership Project, "Technical Specification Group Services and System Aspects; General Packet Radio Service (GPRS) enhancements for Evolved Universal Terrestrial Radio Access Network (E-UTRAN) access (Release 13)," 3GPP TS 23.401 V13.0.0 (Sep. 2014).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.12.0 (Jun. 2014).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.13.0 (Dec. 2014).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.16.0 (Dec. 2014).
Third Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.10.0 (Jun. 2014).
Third Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.11.0 (Dec. 2014).
Third Generation Partnership Project, "Technical Specification Group Services and System Aspects; Service requirements for the Evolved Packet System (EPS) (Release 8)," 3GPP TS 22.278 V8.10.0 (Dec. 2009).
Third Generation Partnership Project, "Technical Specification Group Services and System Aspects; Service requirements for the Evolved Packet System (EPS) (Release 10)," 3GPP TS 22.278 V10.2.0 (Sep. 2010).
Third Generation Partnership Project, "Technical Specification Group Services and System Aspects; Service requirements for the Evolved Packet System (EPS) (Release 11)," 3GPP TS 22.278 V11.6.0 (Sep. 2012).
Third Generation Partnership Project, "Technical Specification Group Services and System Aspects; Service requirements for the Evolved Packet System (EPS) (Release 9)," 3GPP TS 22.278 V9.6.0 (Sep. 2010).
Third Generation Partnership Project, "Technical Specification Group Services and System Aspects; Service requirements for the Evolved Packet System (EPS) (Release 12)," 3GPP TS 22.278 V12.5.0 (Sep. 2014).

(56) References Cited

OTHER PUBLICATIONS

Third Generation Partnership Project, "Technical Specification Group Services and System Aspects; Service requirements for the Evolved Packet System (EPS) (Release 13)," 3GPP TS 22.278 V13.1.0 (Sep. 2014).
Third Generation Partnership Project, "Technical Specification Group Services and System Aspects; Service requirements for the Evolved Packet System (EPS) (Release 12)," 3GPP TS 22.278 V12.6.0 (Dec. 2014).
Third Generation Partnership Project, "Technical Specification Group Services and System Aspects; Service requirements for the Evolved Packet System (EPS) (Release 13)," 3GPP TS 22.278 V13.2.0 (Dec. 2014).
Third Generation Partnership Project, "Technical Specification Group Services and System Aspects; General Packet Radio Service (GPRS) enhancements for Evolved Universal Terrestrial Radio Access Network (E-UTRAN) access (Release 12)," 3GPP TS 23.401 V12.10.0 (Sep. 2015).
Third Generation Partnership Project, "Technical Specification Group Services and System Aspects; General Packet Radio Service (GPRS) enhancements for Evolved Universal Terrestrial Radio Access Network (E-UTRAN) access (Release 12)," 3GPP TS 23.401 V12.6.0 (Sep. 2014).
Third Generation Partnership Project, "Technical Specification Group Services and System Aspects; Study on extended architecture support for Proximity-based services (Release 13)," 3GPP TR 23.713 V0.1.0 (Jul. 2014).
Third Generation Partnership Project, "Technical Specification Group Services and System Aspects; Study on extended architecture support for proximity-based services (Release 13)," 3GPP TR 23.713 V13.0.0 (Sep. 2015).
Third Generation Partnership Project, "Technical Specification Group Services and System Aspects; Proximity-based services (ProSe); Stage 2 (Release 13)," 3GPP TS 23.303 V13.1.1 (Sep. 2015).
Third Generation Partnership Project, "Technical Specification Group Services and System Aspects; Proximity-based services (ProSe); Stage 2 (Release 12)," 3GPP TS 23.303 V12.6.0 (Sep. 2015).
Third Generation Partnership Project, "Technical Specification Group Services and System Aspects; Proximity-based services (ProSe); Stage 2 (Release 12)," 3GPP TS 23.303 V12.2.0 (Sep. 2014).
Qualcomm Incorporated, "General principles for ProSe Restricted Discovery," S2-142815, SA WG2 Meeting #104, Dublin, Ireland (Jul. 7-11, 2014).
Qualcomm Incorporated, "General principles for ProSe Restricted Discovery," S2-142440, SA WG2 Meeting #104, Dublin, Ireland (Jul. 7-11, 2014).
Qualcomm Incorporated et al., "ProSe On-Demand-Discovery (Model B)," S2-144694, SA WG2 Meeting #106, San Francisco, California, USA (Nov. 17-21, 2014).
Interdigital et al., "Restricted ProSe Direct Discovery Model B procedures," S2-151511, SA WG2 Meeting #109, Fukuoka, Japan (May 25-29, 2015).
Third Generation Partnership Project, "Technical Specification Group Services and System Aspects; Study on architecture enhancements to support Proximity-based Services (ProSe) (Release 12)," 3GPP TR 23.703 V12.0.0 (Feb. 2014).

* cited by examiner

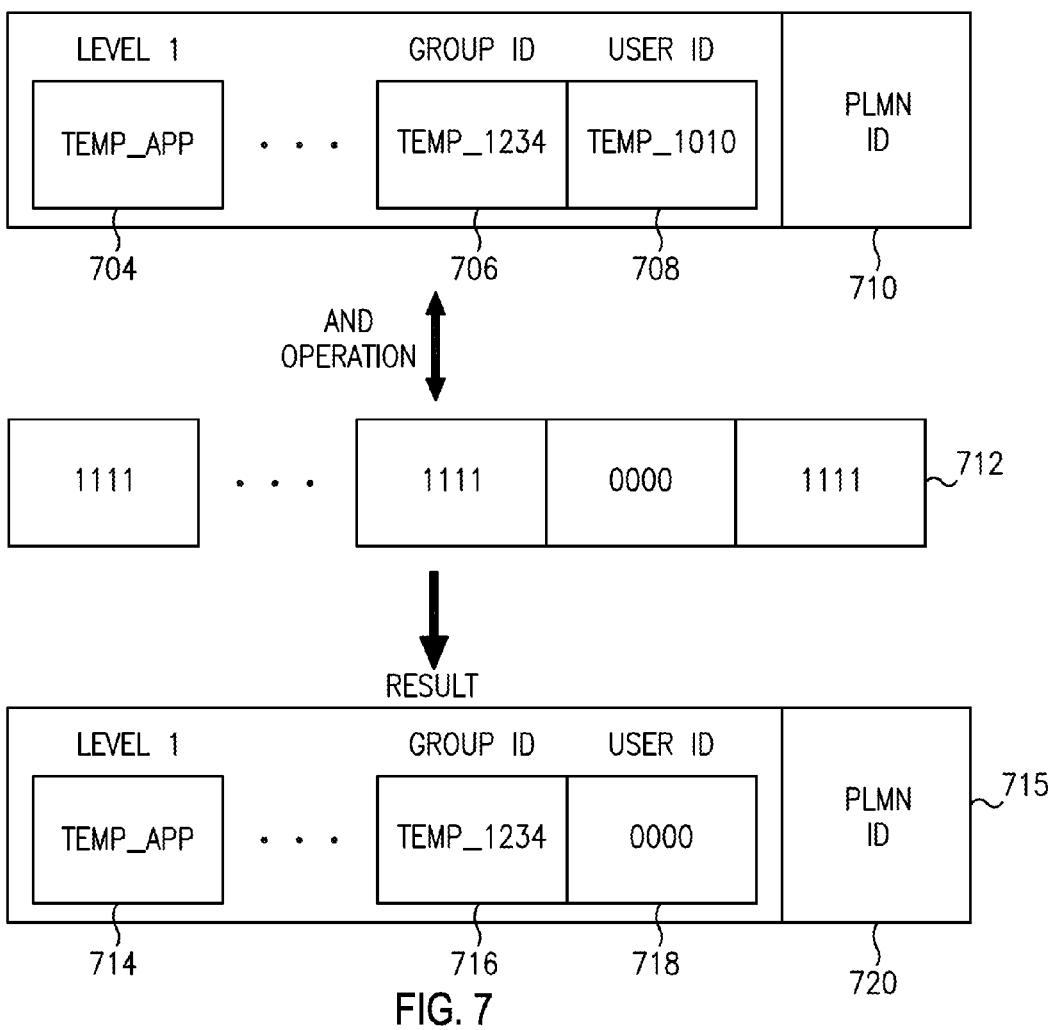

METHODS FOR RESTRICTED DIRECT DISCOVERY

CROSS REFERENCE TO RELATED APPLICATIONS

This application claims the benefit of U.S. Provisional Application No. 62/059,650, filed Oct. 3, 2014, and U.S. Provisional Application No. 62/103,925, filed Jan. 15, 2015, the contents of which are hereby incorporated by reference herein.

BACKGROUND

Proximity services (ProSe) enable network assisted discovery of users in close physical proximity and the facilitation of direct communication between those users. Direct communication may involve a radio connection established between the users' wireless communication devices without transiting the network. ProSe may save network resources, and may permit public safety communication when network coverage is unavailable, social networking, file transfer, and other services between devices.

SUMMARY

Techniques may be used for restricted direct discovery in proximity services (ProSe). A ProSe function may receive a discovery request message from a discovery wireless transmit/receive unit (WTRU), which may include a restricted ProSe Application identity (ID) of an application located at the announcing WTRU requesting ProSe discovery. The ProSe function may derive a first ProSe application code for the announcing WTRU and a second ProSe application code for at least one monitoring WTRU, which may be based on at least the Restricted ProSe Application ID, and send the first and/or second ProSe application codes to the announcing and/or monitoring WTRUs. A ProSe application server may receive a revocation message from an announcing WTRU including at least one restricted ProSe application user ID corresponding to at least one revoked WTRU. The ProSe application server may identify and obtain a ProSe discovery WTRU ID for the at least one revoked WTRU, and provide it to the ProSe Function in the home public land mobile network (HPLMN) of the announcing WTRU. The ProSe function may receive the authorization to revoke message, and may instruct the announcing WTRU to stop announcing a ProSe code known by the revoked WTRU. The ProSe function may allocate a new ProSe code for the announcing WTRU and transmit the new ProSe code to at least one WTRU authorized to discover the announcing WTRU.

BRIEF DESCRIPTION OF THE DRAWINGS

A more detailed understanding may be had from the following description, given by way of example in conjunction with the accompanying drawings wherein:

FIG. 6 is a diagram of an example mask that may be provided by a ProSe function;

FIG. 7 is a diagram of an example mask procedure that may be performed by a monitoring wireless transmit/receive unit (WTRU);

DETAILED DESCRIPTION

Figure 1A:
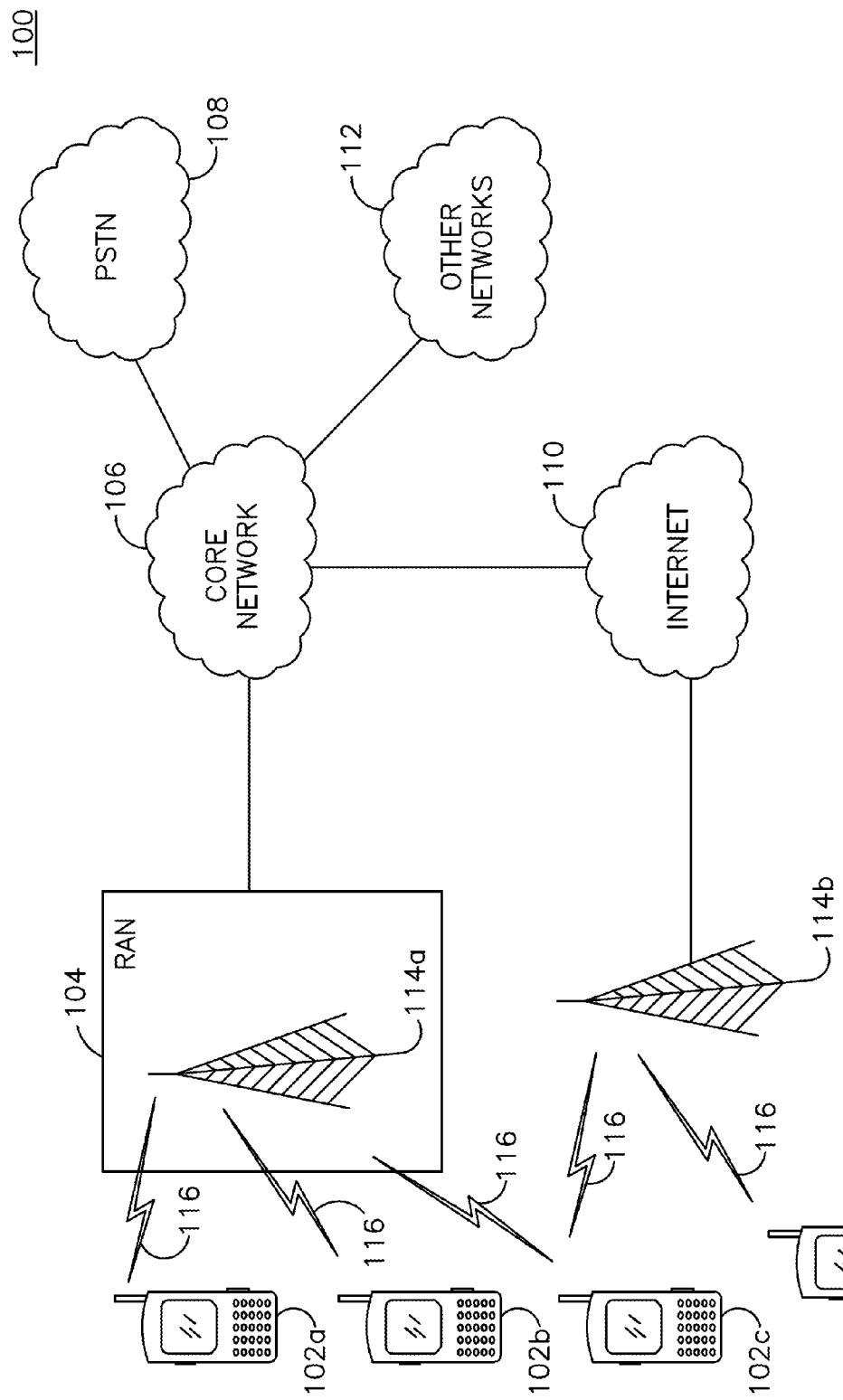
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the radio access network (RAN) 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
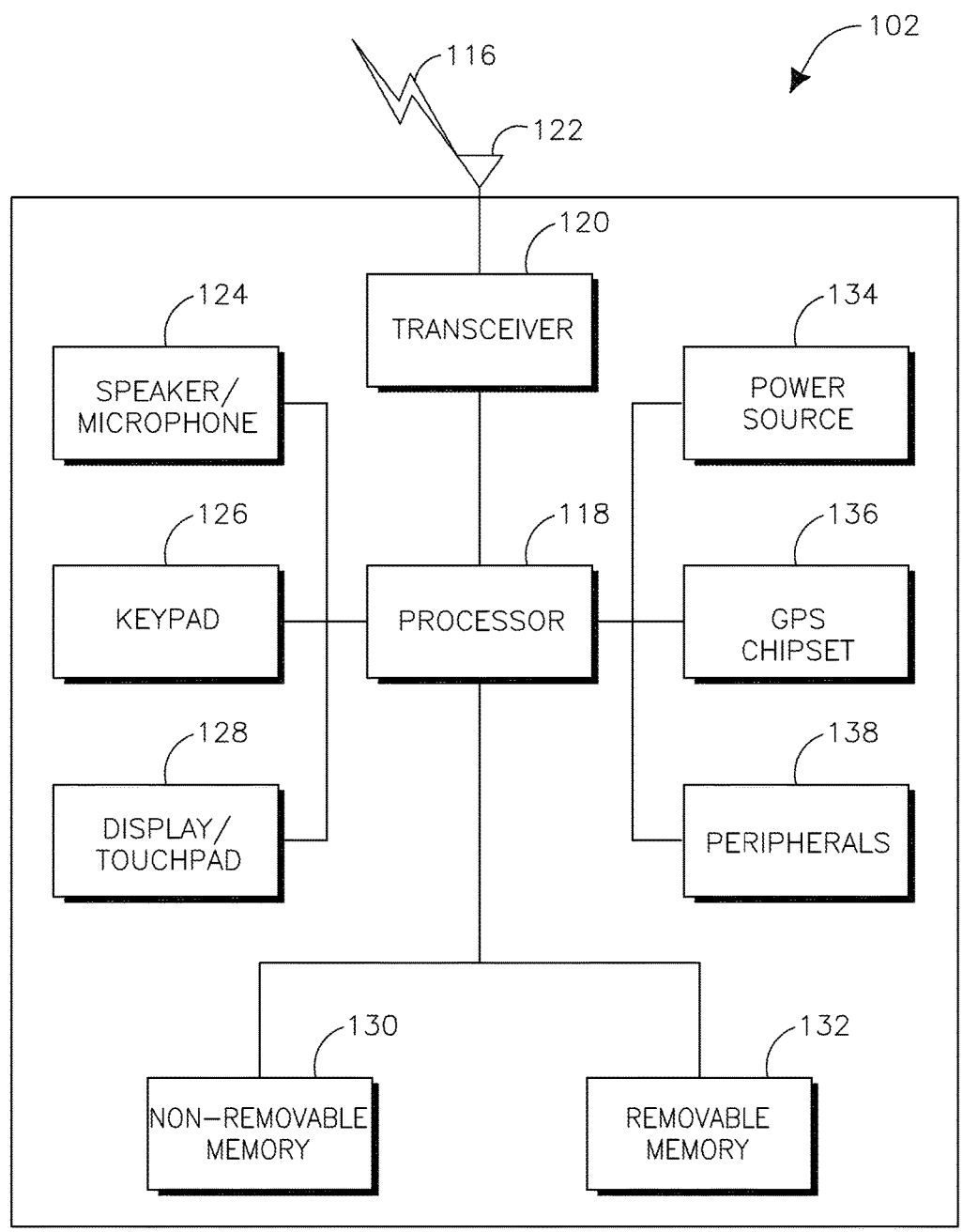
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/ touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
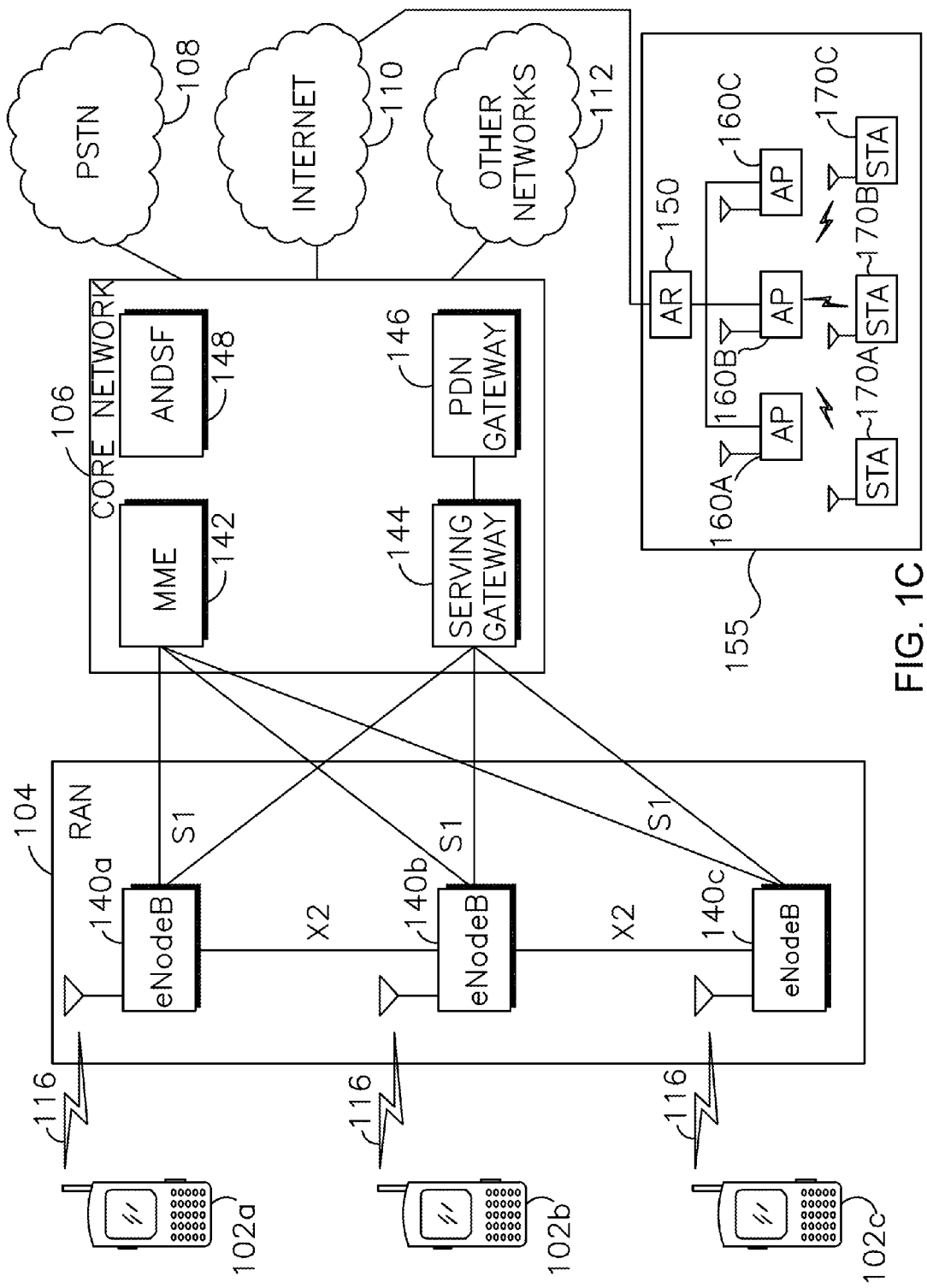
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

The following methods described herein are performed by a WTRU for exemplary purposes, but they may also be performed by a UE, eNB, BS, STA, or any other device capable of operating in a wireless communications network.

Figure 2:
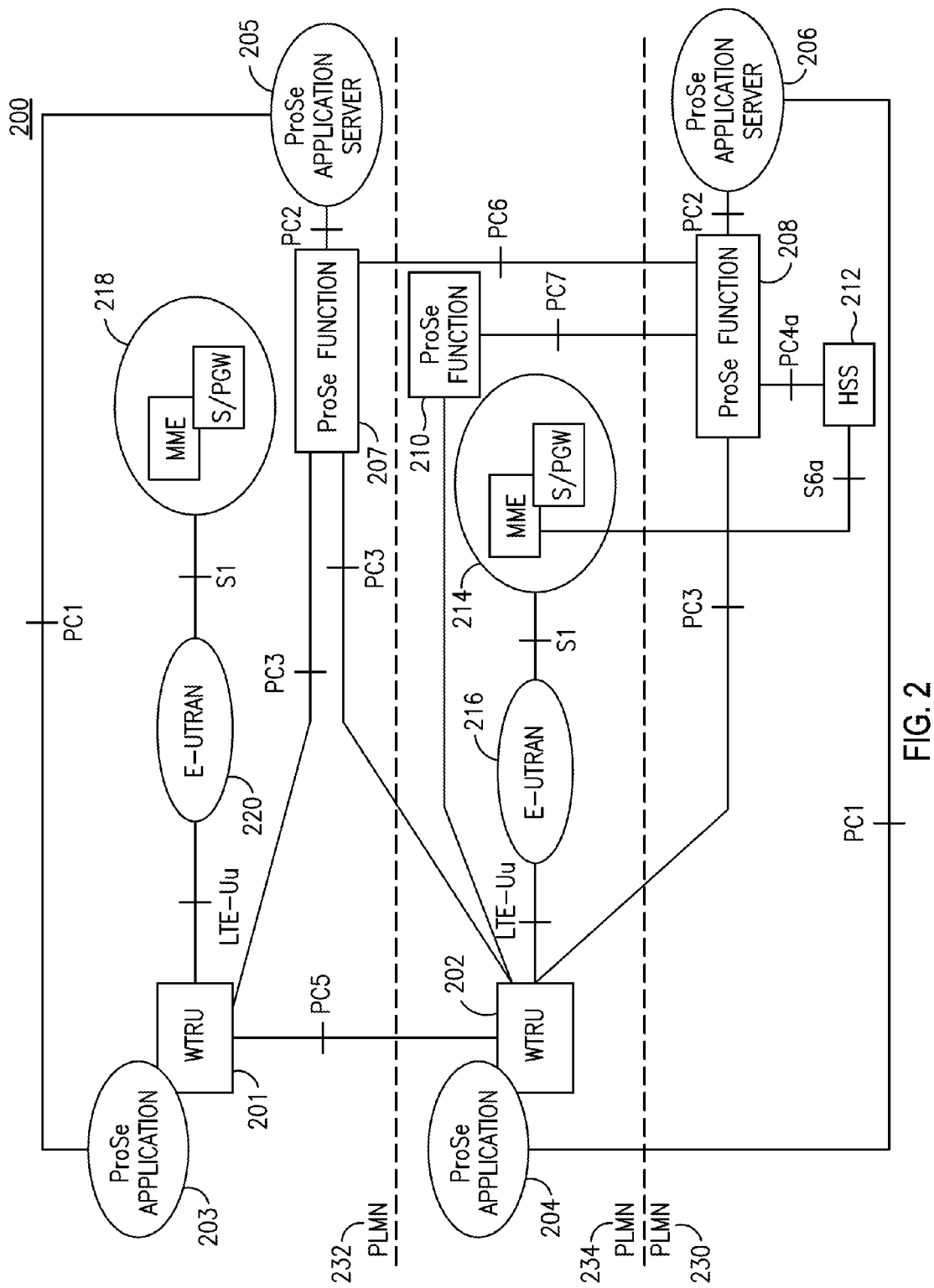
FIG. 2 is a block diagram of an example proximity service (ProSe) reference architecture.

FIG. 2 is a block diagram of an example proximity service (ProSe) reference architecture 200, which may include public land mobile networks (PLMNs) 230, 232 and 234. The example ProSe reference architecture 200 may include, but is not limited to include: WTRUs 201 and 202 with respective ProSe applications 203 and 204; ProSe Application Servers 205 and 206; ProSe Functions 207, 208 and 210; Home Subscriber Server (HSS) 212; MMEs 214 and 218 (which may be connected to or co-located with a respective Serving/Packet Data Network (PDN) Gateway (S/PGW); and/or evolved UMTS Terrestrial Radio Access Networks (E-UTRANs) 216 and 220. Note that E-UTRANs 216 and 220 may include one or more eNode Bs (eNBs, not shown).

Many reference points are shown in the example ProSe reference architecture 200, as described in the following. PC1 may be the reference point between a ProSe application 203 or 204 in WTRU 201 or 202, respectively, and a respective ProSe Application Server 205 or 206. PC1 may be used to define application level signaling requirements. PC2 may be the reference point between the ProSe Application Server 205 or 206 and a respective ProSe Function 207 or 208. PC2 may be used to define the interaction between ProSe Application Server 205 or 206 and ProSe functionality (e.g. name translation) provided by the Third Generation Partnership Project (3GPP) evolved packet system (EPS) (not shown) via the respective ProSe Function 207 or 208 for EPC-level ProSe discovery.

PC3 may be the reference point between the WTRU 202 and ProSe Functions 207, 208, and/or 210. PC3 may use the evolved packet core (EPC) user plane for transport (i.e. an "over IP" reference point). PC3 may be used to authorize ProSe Direct Discovery and EPC-level ProSe Discovery requests and may perform allocation of ProSe Application Codes corresponding to ProSe Application Identities used for ProSe Direct Discovery. PC3 may be used to define the authorization policy per PLMN for ProSe Direct Discovery (e.g. for Public Safety and non-Public Safety) and communication (e.g. for Public Safety) between WTRUs 202 and/or 203 and the ProSe Functions 207, 208, and/or 210.

PC4a may be the reference point between the HSS 212 and ProSe Function 208. PC4a may be used to provide subscription information in order to authorize access for ProSe Direct Discovery and ProSe Direct Communication on a per PLMN basis. It may be used by the ProSe Function 208 (e.g. EPC-level ProSe Discovery Function) for retrieval of EPC-level ProSe Discovery related subscriber data. PC5 may be the reference point between WTRUs 201 and 202 and may be used for the control plane and/or user plane for ProSe Direct Discovery, ProSe Direct Communication, and/or ProSe WTRU-to-Network Relay. When a WTRU 201 is not roaming, PC6 may be the reference point between the ProSe Function 207 in the home PLMN (HPLMN) 232 for WTRU 201 and the ProSe Function 208 in a different PLMN 230. PC6 may be used, for example, to authorize ProSe Direct Discovery requests, and/or perform allocation of ProSe Application Identity Codes and ProSe Application Identity Names from the HPLMN 232 of WTRU 201. PC6 may be used for HPLMN control of ProSe service authorization.

When the WTRU 202 may be roaming, PC7 may be the reference point between the ProSe Function 210 in the HPLMN 234 of WTRU 202 and the ProSe Function 208 in the visited PLMN (VPLMN) 230 or ProSe Function 208 in another PLMN 230. PC7 may be used to authorize ProSe Direct Discovery requests, and/or may perform allocation of ProSe Application Identity Codes and ProSe Application Identity Names from the HPLMN 234 for WTRU 202. PC7 may be used for HPLMN control of ProSe service authorization.

S6a may be the reference point used to download ProSe related subscription information to MME 214 during an E-UTRAN 216 attach procedure or to inform the MME 214 that MME subscription information in the HSS 212 has changed. S1 may be used in ProSe to provide an indication from the MME 214 or 218 to an eNB in the E-UTRAN 216 or 220, respectively, that the respective WTRU 202 or 201 may be authorized to use ProSe Direct Discovery. The LTE-Uu interface may be used between the WTRUs 201 and 202 and the E-UTRAN 216 and 220, respectively. The LTE-Uu interface may be used to communicate control messages between the WTRUs 201 and 202 and the LTE system and/or for transporting user plane data between the WTRUs 201 and 202 and the Internet.

As described herein, the ProSe Function may be a logical function that may be used for network related actions required for ProSe. The ProSe Function may play different roles for each of the features of ProSe. According to an example, the ProSe Function may consist of one or more of the following sub-functions that perform different roles depending on the ProSe feature: the Direct Provisioning Function (DPF); the Direct Discovery Name Management Function; and/or the EPC-level Discovery ProSe Function. These ProSe sub-functions of the ProSe Function are described in more detail below.

The DPF may be used to provision the WTRU with parameters in order to use ProSe Direct Discovery and/or Prose Direct Communication. The DPF may be used to provision WTRUs with PLMN-specific parameters that allow a WTRU to use ProSe in the specific PLMN. In an example, for direct communication used for Public Safety, DPF may provision the WTRU with parameters that may be used when the WTRU is served by E-UTRAN. The Direct Discovery Name Management Function may be used for open Prose Direct Discovery to allocate and/or process the mapping of ProSe Applications identities (IDs) and/or ProSe Application Codes used in ProSe Direct Discovery. The Direct Discovery Name Management Function may use ProSe related subscriber data stored in an HSS for authorization of each discovery request. The Direct Discovery Name Management Function may also provide the WTRU with security material so that the WTRU may protect discovery messages transmitted over the air.

The EPC-level Discovery ProSe Function may have a reference point towards the Application Server (e.g. reference point PC2), towards the HSS (e.g. reference point PC4a) and towards the WTRU (e.g. reference point PC3). The functionality of the EPC-level Discovery ProSe Function may include, but is not limited to include, any of the following: storage of ProSe-related subscriber data and/or retrieval of ProSe-related subscriber data from the HSS; authorization and/or configuration of the WTRU for EPC-level ProSe Discovery and/or EPC-assisted WLAN direct discovery and communication; storage of a list of applications that may be authorized to use EPC-level ProSe Discovery and EPC-assisted WLAN direct discovery and communication; acting as a location services client (e.g. Service Location Protocol (SLP) agent) to enable EPC-level ProSe Discovery; providing the WTRU with information to assist WLAN direct discovery and communications; handling of EPC ProSe Subscriber IDs and Application Layer User IDs; security related functionality; interaction with WTRU over PC3 reference point; interaction with third party Application Servers over a PC2 reference point; interaction with ProSe Functions in other PLMNs over a PC6 reference point; support for functionality for requesting WTRU location via the HSS; and/or providing functionality for charging via the EPC or outside of the EPC (e.g. offline charging). The ProSe Function may provide charging functionality for usage of ProSe, which may include ProSe via the EPC and/or for ProSe Direct Discovery and ProSe Direct Communication.

ProSe may use any of the following Direct Discovery procedures: Model A or "I am here" Direct Discovery; and/or Model B or "who is there?/are you there?" Direct Discovery. These Direct Discovery procedures are described in detail below. Herein, an announcing WTRU may be responsible for announcing discovery and may be interchangeable referred to as an announcing or discoverer WTRU. The monitoring WTRU may be responsible for monitoring discovery information and may be referred to interchangeably as the monitoring or discoveree WTRU.

According to the Model A ("I am here") procedure, a ProSe-enabled WTRU may be designated to one of two roles when participating in ProSe Direct Discovery: announcing WTRU may announce certain information that may be used by WTRUs in proximity that have permission to discover; or monitoring WTRU may monitor certain information of interest in proximity of announcing WTRUs. According to model A, the announcing WTRU may broadcast discovery messages at pre-defined discovery intervals, and the monitoring WTRUs that may be interested in these messages may receive, read, and/or process the discovery messages. Model A may be considered equivalent to an "I am here" approach because the announcing WTRU may broadcast information about itself in the discovery message, such as its ProSe Application Identities, and/or ProSe WTRU Identities.

According to the Model B ("who is there?/are you there?") procedure, a ProSe-enabled WTRU may be designated to one of two roles when participating in ProSe Direct Discovery: discoverer WTRU may transmit a request containing certain information about what it may be interested to discover; discoveree WTRU may receive the request message and may respond with some information related to the discoverer WTRU's request.

Figure 3:
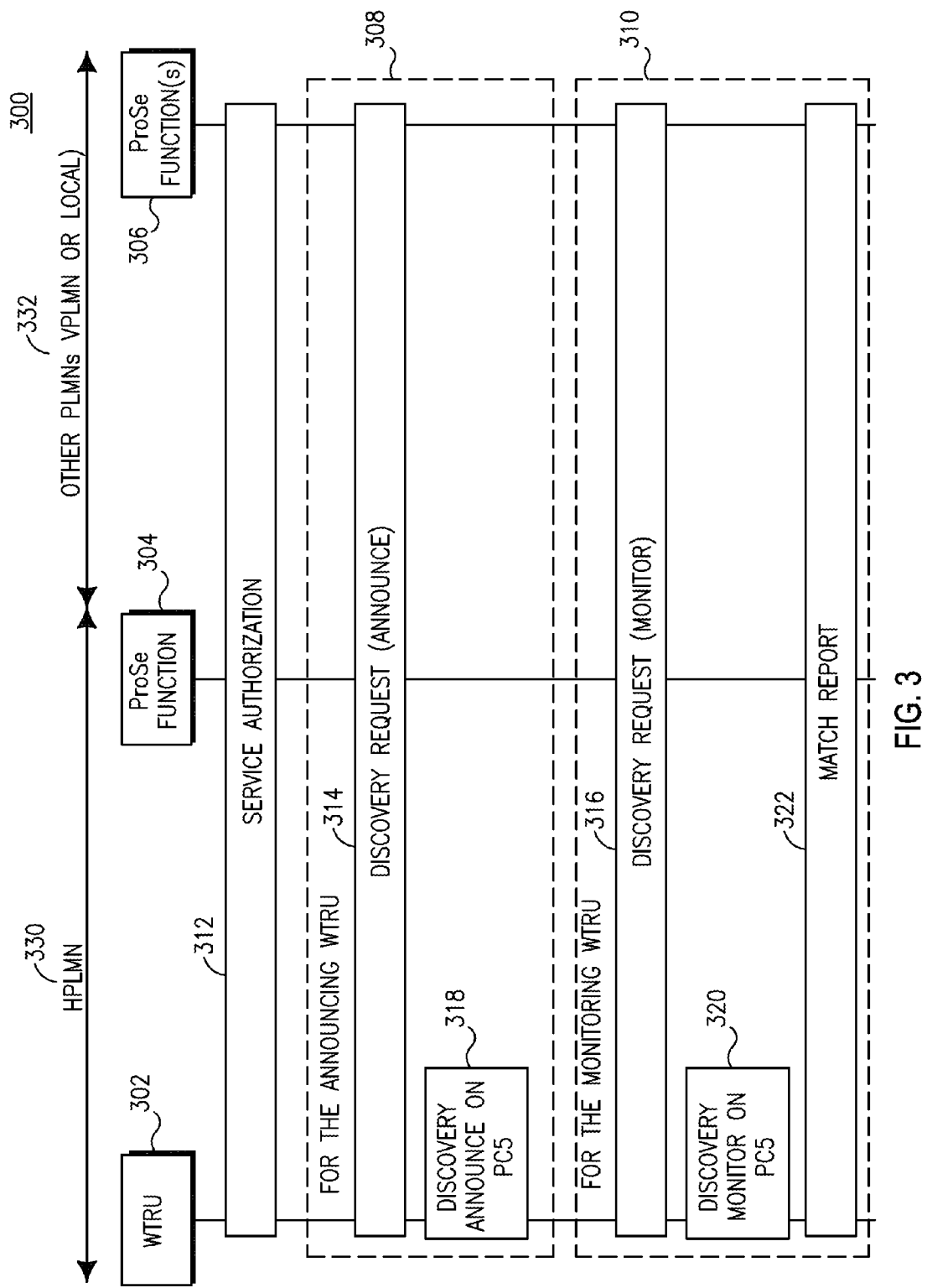
FIG. 3 is a flow diagram of an example Open Direct Discovery procedure consistent with Model A.

FIG. 3 is a flow diagram of an example Open Direct Discovery procedure 300 consistent with Model A. Actions between the WTRU 302 and the ProSe Function 304 may occur in the HPLMN 330 of the WTRU 302. Actions between the ProSe Function 304 and other ProSe Function(s) 306 may occur on other PLMNs 332, such as a VPLMN or a local PLMN. During service authorization 312, the WTRU 302 may obtain from the ProSe Function(s) 304 and/or 306 (e.g. via Open Mobile Alliance (OMA) Device Management (DM) procedures) authorization to announce or monitor in a particular PLMN, such as HPLMN 330 and/or other PLMN(s) 332.

If the WTRU 302 is authorized to announce and follows the announcing WTRU procedure 308, then the WTRU 302 may send a Discovery (Announce) Request message 314 (e.g. via PC3 reference point) to the ProSe Function(s) 304 and/or 306. The Discovery (Announce) Request message 314 may include the service that the WTRU 302 wants to advertise, using for example a ProSe Application ID. As part of authorization 312, the ProSe Function(s) 304 and/or 306 may provide a ProSe Application Code to the WTRU 302 in order to announce the ProSe Application Code via the Discovery Announce Request message 314. The WTRU 302 may perform a discovery announce procedure 318 on, for example using a PC5 Discovery Message with the type set to "announce". The PC5 Discovery Message may include a ProSe (Application) Code that may have been obtained from the ProSe Function. The WTRU 302 may use the resources as indicated by the E-UTRAN for transmitting discovery/announce messages.

If the WTRU 302 is authorized to monitor in a particular PLMN and follows the monitoring WTRU procedure 310, then the WTRU 302 may send a Discovery Monitor Request message 316 (e.g. via the PC3 reference point) to the ProSe Function(s) 304 and/or 306. The Discovery Monitor Request message 316 may include the service that the WTRU 302 wants to discover/monitor, using for example a ProSe Application ID. As part of authorization 312, the ProSe Function(s) 304 and/or 306 may provide a ProSe Application Code to the WTRU 302 to monitor.

At 320, the WTRU 302 may monitor resources (e.g. as indicated by the E-UTRAN) on which discovery messages are expected to be received/monitored. When the WTRU 302 receives a discovery message, it may verify if the ProSe (Application) Code in the received message matches any of the WTRU's Discovery Filters, which it may have previously received from the ProSe Function 304. If there is a (partial) match between the received ProSe code and the Discovery Filters, the WTRU may send a Match Report 322 to the ProSe Function 304 using the PC3 reference point. The ProSe Function 304 may respond to confirm if the WTRU 302 is allowed to discover the announcing WTRU and may also provide further information such that a full match of the ProSe code may be achieved by the discovering WTRU 302.

Identifiers for ProSe Direct Discovery may include, but are not limited to, the following: ProSe Application ID; and/or ProSe Application Code. These ProSe Direct Discovery IDs are described in detail below.

For Open ProSe Discovery, the ProSe Application ID may be called the Public ProSe Application ID. The geographic scope of the Public ProSe Application ID may be PLMN-specific, country specific or global. Each Public ProSe Application ID may be composed of parts including, but not limited to, the following: the ProSe Application ID Name may be described in its entirety by a data structure characterized by different levels, for example broad-level business category (Level 0), business sub-category (Level 1), business name (Level 2), and/or shop ID (Level 3). A ProSe Application ID Name may be displayed as a string of labels in which the labels represent hierarchical levels. The PLMN ID that corresponds to the PLMN may be assigned the ProSe Application ID Name. If the Public ProSe Application ID is country specific then the Mobile Network Code (MNC) of the PLMN ID may be wild carded. If the Public ProSe Application ID is global, then the MCC and/or the MNC may be wild carded.

For the announcing WTRU, the ProSe Application Code may be obtained from the HPLMN ProSe Function using the Announce Request procedure. The ProSe Application Code may be contained in the message that may be transmitted over the radio interface (e.g. over PC5) by a WTRU engaged in the ProSe Direct Discovery procedure to monitor WTRUs. For the monitoring WTRU, Discovery Filter(s) to monitor the ProSe Application Code(s) over the radio interface (e.g. on PC5) may be obtained from the HPLMN ProSe Function using the Monitor Request procedure.

A ProSe Application code may be assigned by a HPLMN ProSe Function. Each ProSe Application Code may include, but is not limited to include, any of the following: a temporary identity that may correspond to the ProSe Application ID Name; and/or a PLMN ID of the ProSe Function that assigned the ProSe Application Code (i.e. Mobile Country Code (MCC) and Mobile Network Code (MNC)). Given the data structure associated with the Public ProSe Application ID, each ProSe Application ID may be associated with various temporary identities that contain as many identifiers as there may be levels in the corresponding ProSe Application ID Name, which may allow partial matching at the monitoring WTRU side using a ProSe Application Mask or a Discovery Filter. The use of temporary identities may make the filtering of the received temporary identity in a monitoring WTRU more effective and flexible.

ProSe Application Code matching may consider all components listed above. In ProSe Application Code matching, the monitoring WTRU may consider it a full match when both the PLMN ID and temporary identity match with the corresponding contents of the Discovery Filter. A partial match may be obtained if the PLMN ID matches fully and the temporary identity matches partially with the corresponding contents of the ProSe Application Mask. A ProSe Application Code may be allocated per announcing WTRU and per application and may have an associated validity timer that may run in the ProSe Function and in the WTRU. Revoking an assigned ProSe Application Code from the announcing WTRU before the expiry of the validity timer may not be permitted in some solutions.

In the case of Open ProSe Discovery, when the announcing WTRU wants to announce something, the announcing WTRU may send a Discovery Request containing the Public ProSe Application ID to the ProSe Function, and the ProSe Function may assign a ProSe Application Code. When the monitoring WTRU wants to monitor something, the monitoring WTRU may send a discovery request containing the full or a subset of the Public ProSe Application ID. For example, the monitoring WTRU may provide two out of the n levels of the full Public ProSe Application ID. The ProSe Application ID Name may have several levels or tiers.

For restricted discovery, the WTRU may provide to the ProSe Function an identifier that identifies the user and identifiers for a list of "friends" that are WTRUs/users that may be allowed to discover the user. The ProSe Function may contact the application server in order to verify that the user may be allowed to discover his/her friends. The ProSe Function may provide to the WTRU a list of codes to monitor in order to detect if any of his/her friends may be in proximity.

Approaches may be defined for restricted discovery for Model A type discoveries and Model B type discoveries. In a 3GPP Release 12 discovery service, there may be no concept of group discovery. The ProSe Application Codes that are transmitted may be in reference to one user (at the application level) or a group of users. An approach may include discovering a group of WTRUs and/or a user within a group. According to an approach, a group identifier may be used for Model A and Model B restricted discovery. For example, methods may be used for authenticating a Restricted ProSe Application ID by the ProSe Function. This approach may be used in the case that the Restricted ProSe Application ID is configured by the application.

Model B discovery may allow a user to discover whether a group or a user may be nearby. It may be different than Model A discovery, in which a user may announce a ProSe Application Code for discovery. Accordingly, Model B discovery may include, but is not limited to include, the following: a method for a WTRU to use a ProSe Application Code to identify if a group or a user is nearby; and/or a method for a monitoring WTRU to respond to a ProSe Application Code for Model B discovery.

There may be stage 1 requirements for restricted discovery that allow a user to revoke permission for discovery. In this case techniques may be defined for a 3GPP network to enforce revocation of restricted discovery, and/or for the ProSe Function to manage the ProSe Codes after a user revokes permission for discovery to a single user or a group of users, where the ProSe Codes may be codes that represent an application, service, or store, for example.

According to an example, identifiers may be used for Restricted Discovery. A format for the ProSe Application ID may include the ProSe Application ID Name having a field that may be reserved for group identification, and another field that may be reserved for individual user identification. For example, the format for the ProSe Application ID Name may be extended and a level added that may refer to the group and user identification. In another example, a format may include, but is not limited to, the following information elements (IEs): Level 1 (e.g. application ID); Level 2 (e.g. service ID); Level 3 (e.g. GROUP ID); and Level 4 (e.g. USER ID). In the following, field and information element (IE) may be used interchangeably.

Figure 4:
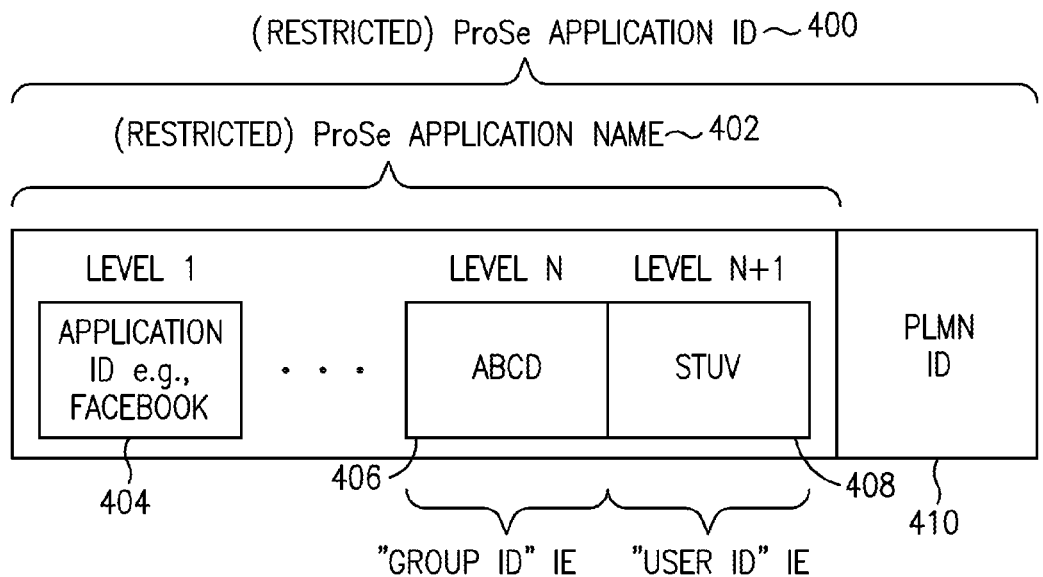
FIG. 4 is a diagram of an example ProSe Application ID format, which may be used for restricted discovery.

FIG. 4 is a diagram of an example (Restricted) ProSe Application ID format 400, which may be used for restricted discovery. For example, for a WTRU that wants to announce a ProSe code, the WTRU may generate a ProSe Application ID according to the ProSe Application ID format 400, and may send the ProSe Application ID to a ProSe Function. The example ProSe Application ID format 400 may include a part for the (restricted) ProSe Application Name field 402 that may include sub-parts or levels 1 . . . N+1. The ProSe Application ID format 400 may include a PLMN ID field 410 that may indicate the WTRU's HPLMN, for example.

The ProSe Application Name field 402 may include an Application ID 404 at level 1 (and additional application IDs at other levels e.g. level 2 . . . N−1), a GROUP ID field 406, and/or a USER ID field 408. The GROUP ID field 406 may be included at level N, and may be generated by the WTRU. The GROUP ID field 406 may be common to all WTRUs that are part of the group. For example, the WTRU may get the value of the GROUP ID by interaction with the application server or by direct input by the user. In the example shown in FIG. 4, the announcing WTRU belongs to a group that may be identified as group "ABCD".

The user or WTRU may inform the ProSe Function whether the user allows its individual user identity (i.e. "USER ID" 408 shown as "STUV" in FIG. 4) to be revealed to other members of the group. The Group ID 406 and/or User Application ID 404 may be unique per ProSe application.

The ProSe Function may generate a corresponding ProSe Application Code that has temporary identities corresponding to the sub-parts or levels 1 . . . N+1 shown in ProSe Application ID 400. The ProSe Application Code part related to the group may be shared with all WTRUs that may be part of the same group. The ProSe Function may verify with the application server which WTRUs belong to a certain group that may be identified, or the ProSe function may contain this information locally. The ProSe Function may use the GROUP ID that was sent by the WTRU to verify the specific settings or authorization parameters of the individual WTRUs that may be members of the group with the identified GROUP ID.

According to an example, the WTRU may leave the GROUP ID blank (or set it to a specific value) which may trigger the ProSe Function to get the group information for user and application pair, from the application server or locally. The ProSe Function may respond to the WTRU and provide it with the group ID of the WTRU's (or user) group. In this case, the WTRU may not need to know which group (or group ID) to which it is a member. If the WTRU is part of multiple groups, then the ProSe Function may return a code for each group, and this may be differentiated at the WTRU side by the different values of the GROUP ID field. The WTRU may save the different group(s) to which it belongs and the different groups that it may monitor. The ProSe Function may set the USER ID field to a temporary value that may be specific to the user (or WTRU) in question. For an announcing WTRU, the ProSe Function may return at least one ProSe Application Code to announce where the "USER ID" field may be unique to the WTRU.

Figure 5:
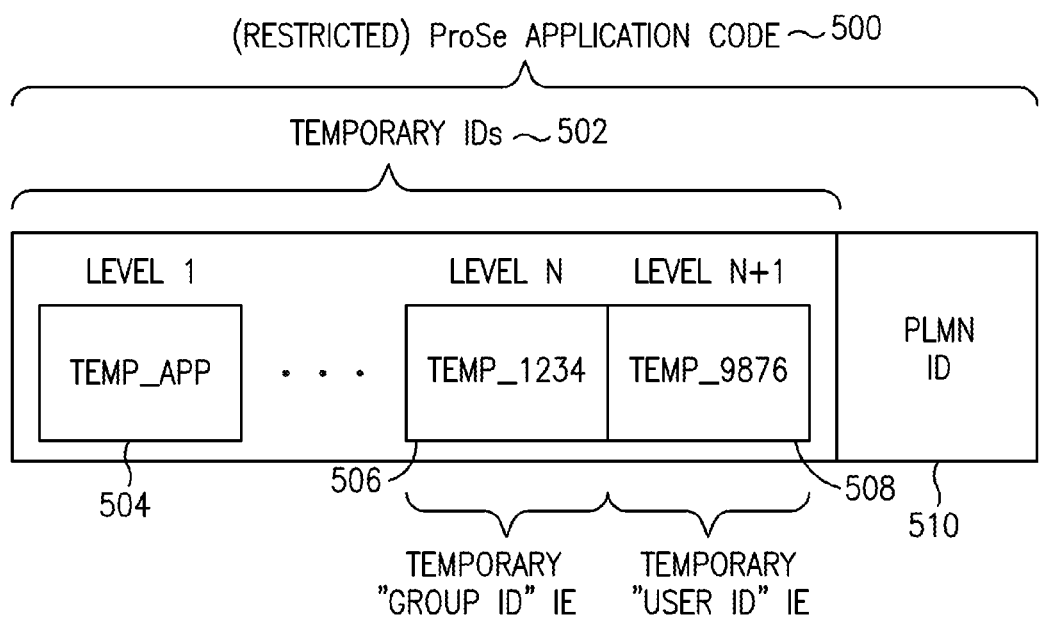
FIG. 5 is a diagram of an example (Restricted) ProSe Application Code format.

FIG. 5 is a diagram of an example (Restricted) ProSe Application Code format 500, which may correspond to the (Restricted) ProSe Application ID format 400 in FIG. 4. With reference to FIG. 5, the example ProSe Application Code format 500 (or, ProSe code format 500) may include temporary IDs 502 that may include sub-parts or levels 1 . . . N+1 (corresponding to the levels 1 . . . N+1 in ProSe Application ID format 400 in FIG. 4). The ProSe Application Code format 500 may include a PLMN ID field 510 that may indicate the WTRU's HPLMN, for example.

For any WTRU that may be part of the same group, which in turn may also request a code to announce, the ProSe Function may provide the same temporary ID (e.g. Temp_1234) for the GROUP ID IE 506. The USER ID IE 508 may have a value that may be unique to the WTRU. In an example, the USER ID IE 508 may be a pointer to the user's ID at the application layer. The USER ID IE 508 may not represent a subscriber ID such as an International Mobile Subscriber Identity (IMSI), for example. The ProSe Function may map the group ID (or name, as provided for example by the WTRUs, or per local policies or per verification with the application server) to the temporary ID returned in the GROUP ID IE 506 in the generated ProSe Application Code 500. The Temp_app field 504 may represent the Application ID (e.g. application ID 404 in FIG. 4), and may use a temporary ID to represent the Application ID.

For the monitoring WTRU that may be part of a particular group, the monitoring WTRU may send a request to get the discovery filters for a particular application. The monitoring WTRU may send a (Restricted) ProSe Application ID (including the ProSe Application ID Name) that may have the same format and levels as the one described in FIG. 4. The monitoring WTRU may set the GROUP ID field (e.g. GROUP ID IE 406 in FIG. 4) to a specific value to indicate the group for which the WTRU wants to monitor. For example, if the WTRU is part of the group "ABCD", then "ABCD" may be the value of the "GROUP ID" IE that is sent by the monitoring WTRU. The USER ID field (e.g. USER ID IE 408 in FIG. 4) may be left blank or may be set to a specific predefined value, if the monitoring WTRU may be not requesting to discover a specific target user. However, as mentioned above, the USER ID field may be left blank (or set to a specific value), which may trigger the ProSe Function to return discovery filters for all groups that the WTRU belongs to (as per verification with the application server or as per local information or policies).

A discovery filter may include, but is not limited to include, a ProSe Application Code (i.e. ProSe code) and/or a mask. If the monitoring WTRU wants to discover a target user ID (identified by a USER ID field), the monitoring WTRU may set the USER ID IE to the specific target user which it may have received over signalling with the application layer. In this case, the GROUP ID IE may be filled with the group identity or may be left blank (or set to a predefined value such that the ProSe Function knows that the request may be really focused on the destination "USER ID" instead of the group).

In response to the monitoring WTRU, the ProSe Function may return a ProSe Application Code whose format may be the same as that provided to all other members of the group that may be announcing. In addition, a mask may be provided to the monitoring WTRU such that when a ProSe Application Code may be monitored over the air, the result of the mask of that monitored GROUP ID may lead to a partial match for the GROUP ID field. In the example of FIG. 5, a monitoring WTRU may receive a (Restricted) ProSe Application Code according to the ProSe Application Code format shown in FIG. 5 whose "GROUP ID" IE has the same temporary value (i.e. "Temp_1234") as that of all monitoring WTRUs of the same group that have requested to announce a code.

FIG. 6 is a diagram of an example mask 600 that may be provided by a ProSe function. When the monitoring WTRU receives a ProSe Application Code over the air from an announcing WTRU, the monitoring WTRU may perform a bitwise AND operation between the received code and the mask 600. FIG. 7 is a diagram of an example mask procedure 700 that may be performed by a monitoring WTRU.

In the example of FIG. 7, a monitoring WTRU may receive a (restricted) ProSe Application Code 702 over the air. The ProSe Application Code 702 may include a temporary application ID 704, a GROUP ID 706, a USER ID 708, and a PLMN ID 710. The monitoring WTRU may apply a mask 712 to the ProSe Application Code 702 using a bitwise AND operation. An AND operation is shown as an example and other masks or bit operations may be used. The result 715 of applying the mask 712 may ensure that the GROUP ID IE 716 has the same value (e.g. Temp_1234) as the GROUP ID IE 706 in the ProSe Application Code 702 that was received by the monitoring WTRU from the ProSe Function. However, the USER ID IE 718 may not match that received USER ID 708 by the monitoring WTRU. Since parts of the codes may match, the WTRU may consider a partial match and may be aware that the announcing WTRU may be a member of its own group, which may have a real ID of "ABCD" but a temporary ID of "Temp_1234" for example.

If a partial match occurs (e.g. the GROUP ID field 716 matches the GROUP ID field 706 of the ProSe Application Code 702), the monitoring WTRU may send a match report that has the monitored ProSe Application Code from the announcer WTRU. The ProSe Function may verify (e.g. by verification with the application server, local information or policies, or previous indications received from the announcing WTRU) whether the monitoring WTRU is allowed to discover the specific user of the identified group. If the monitoring WTRU is allowed to discover the specific user of the identified group, the ProSe Function may return the identity of the announcing WTRU. For example, the ProSe Function may return "STUV" as the announcing WTRU ID so the monitoring WTRU would know that the announcing WTRU is a member of the same group "ABCD" and has specific user ID "STUV".

If the monitoring WTRU is not allowed to get the real ID of the announcing WTRU, the ProSe Function may return a response that indicates that the specific user identity may not be revealed. In this case, the exact user identity may not be revealed to the monitoring WTRU. If the (Restricted) ProSe Application ID and (Restricted) ProSe Application Code have the same format as the ProSe Application ID and the ProSe Application Code, respectively, then the ProSe Function may not be able to differentiate discovery requests (announce or monitor) for group/user ID discovery. To enable differentiation of these discovery requests, the WTRU may indicate in the discovery request (i.e. not as part of the identities) that the WTRU desires to get codes or identities for "Group/User" discovery. The ProSe Function may use this indication to provide the identities and/or discovery filters to the WTRUs as described above.

There may be a mapping between the (Restricted) ProSe Application ID (i.e. Name) and the user identity at the application layer. Thus, a WTRU (monitoring or announcing) may need the functionality to map a (Restricted) ProSe Application ID (i.e. Name) to an application layer identity. The WTRU may have this mapping locally or it may interact with the application server by providing the (Restricted) ProSe Application ID (i.e. Name), and receive the corresponding mapped application layer user identity.

According to an example, restricted discovery identifiers may be used for Model A discovery. In an announce request, a user (WTRU) may request to announce a code for restricted discovery. For example, this procedure may include the ProSe Function verifying the request with the ProSe Application Server over PC2 reference point. A ProSe application may configure a Restricted ProSe Application ID based on user preferences to be discoverable by only certain users. For example, if user Alice has configured a list of users that may be allowed to discover her, the Application may configure the Restricted ProSe Application ID so that the restricted ProSe Application ID may include, but is not limited to, the Application ID, Alice's Group ID, and/or Alice's user application ID.

When the user enables restricted discovery in the WTRU, the WTRU may request from the ProSe Function a Prose Application Code to announce. For example, the WTRU may include, but is not limited to include, in the request any of the following: the Restricted ProSe Application ID (configured by the ProSe Application); application ID; user identity (e.g. IMSI, Mobile Station International Subscriber Directory Number (MSISDN)); and information to indicate that the request is for announcing a Model A code.

If the user is authorised for restricted discovery (based on information provided by the HSS), the ProSe Function may contact the ProSe Application Server over the PC2 reference point to verify that the Restricted ProSe Application ID may be valid. If the Restricted ProSe Application ID is valid, then the ProSe Function may assign a ProSe Application Code and may provide it to the WTRU to announce.

According to an example, the monitoring request sent by the monitoring WTRU may request to monitor a user or a group of users or a service. For example, a user (e.g. Bob) may have requested from the application to discover another user (e.g. Alice). The application may check whether Alice has allowed Bob to discover her and may provide to Bob the Group ID.

Examples of methods for the application to configure the Restricted ProSe Application ID in the monitoring request, include, but are not limited to the following: the application may configure Bob's Restricted ProSe Application ID to include: the Application ID, Alice's Group ID, and/or Bob's user ID; and/or the application may provide Alice's Restricted ProSe Application ID. The WTRU may send a request to monitor an application code by the ProSe Function. In an example, the WTRU may include, but is not limited to include, in the request, any of the following: the Restricted ProSe Application ID (configured by the ProSe Application); the application ID; the user identity (e.g. IMSI, MSISDN); information that the request is for monitoring a Model A code; and/or the user application ID of Bob.

If the user is authorized for restricted discovery (e.g. based on information provided by HSS), the ProSe Function may contact the ProSe Application Server over the PC2 reference point to verify that the Restricted ProSe Application ID is valid. If the Restricted ProSe Application ID is configured using Bob's user ID, the application may check whether Bob's user ID is within the Group ID information configured by Alice. In an example, the ProSe Function may send the Restricted ProSe Application ID and Bob's user ID for verification. If the restricted ProSe Application ID is valid, the ProSe Function may assign a ProSe Application Code and may provide it to the WTRU to announce. The ProSe Application Code may be the announcing code provided to Alice, such that the ProSe Function may need to maintain a mapping between the ProSe codes provided to at least two WTRUs (in this example, the WTRUs associated with Bob and Alice).

According to an example, techniques may be used for restricted Model B discovery. In Model B discovery, a user may request whether a user or a group of user's are nearby. According to an example, the application may configure a Restricted ProSe Application ID that identifies the user. In another example, identifiers assigned by the application and/or the 3GPP network may be used for configuring a Restricted ProSe Application ID to identify the user. In this case, a Restricted ProSe Application ID may identify a user or a group. Thus, identifiers assigned by the application and/or the 3GPP network may be used to control restricted discovery. This approach may also be used for Model A or Model B restricted discovery.

The WTRU may register with the ProSe Function for restricted discovery. The ProSe Function may assign a ProSe WTRU ID. A WTRU that is interested in participating in a restricted discovery may provide a registration request to the ProSe Function over the PC3 reference point and may include, but is not limited to include, in the registration request any of the following: the user's Restricted ProSe Application ID identifying the user; and/or an Application ID identifying the application.

Figure 8:
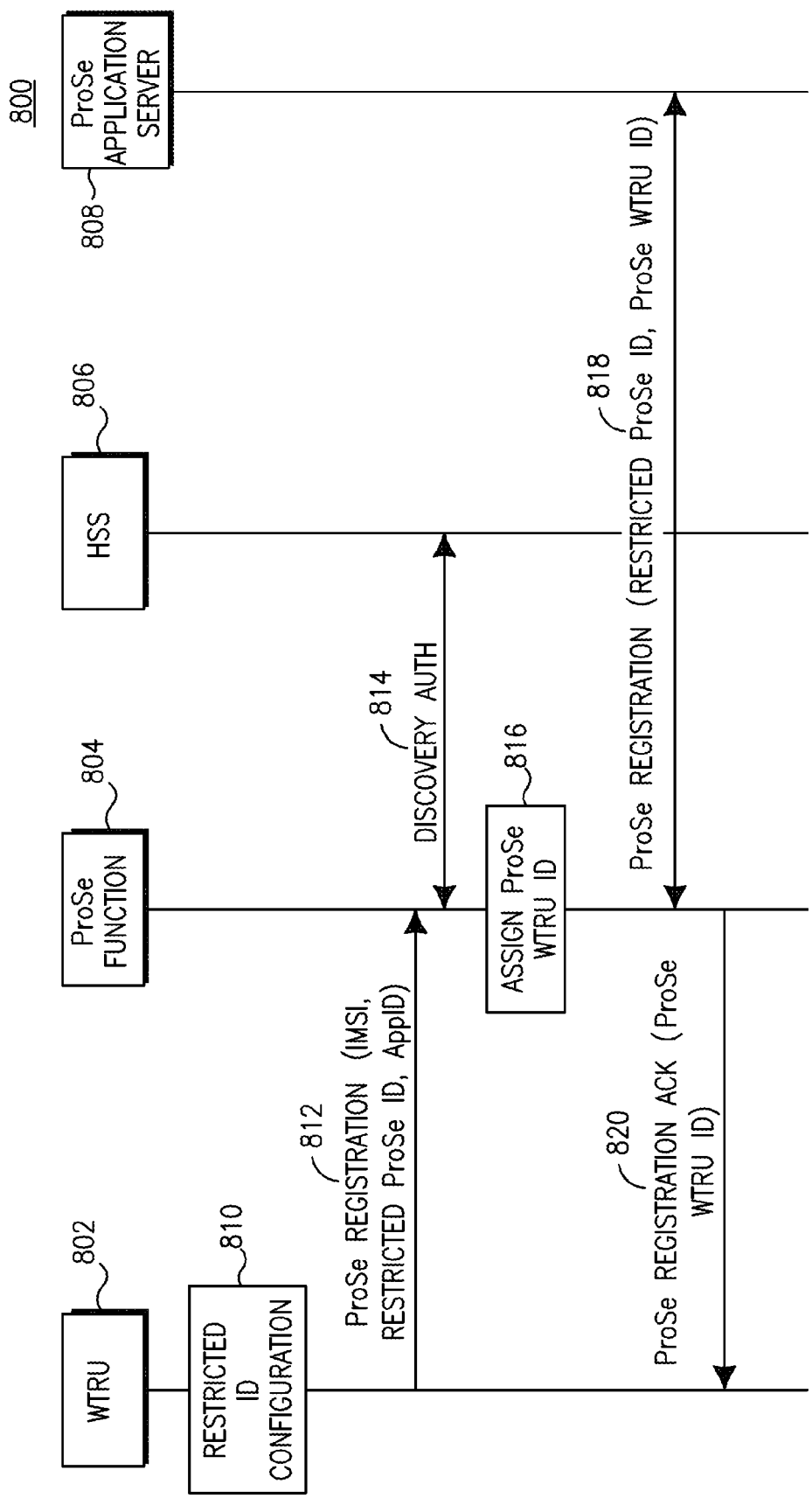
FIG. 8 is a flow diagram of an example Prose Registration procedure as part of ProSe restricted discovery.

FIG. 8 is a flow diagram of an example Prose Registration procedure 800 as part of ProSe restricted discovery. The entities shown in the example of FIG. 8 may include, but or not limited to include, any of the following: WTRU 802; ProSe Function 804; HSS 806; and/or ProSe Application Server 808. At 810, the ProSe application, which may reside in the WTRU 802, may configure a Restricted ProSe Application ID in order to identify a user, a group of users, and/or a service. If the user enables restricted discovery in the WTRU 802, the WTRU 802 may send a ProSe Restricted Discovery Registration request 812 over the PC3 reference point to the ProSe Function 804. The Registration request 812 may include, but is not limited to include, any of the following: the Restricted ProSe Application ID; the Application ID; and/or the user identity (e.g. IMSI, MSISDN).

At 814, the ProSe Function 804 may check with the HSS 806 (e.g. by exchanging messages with the HSS 806) whether the user may be authorized for restricted discovery. At 816, if the authorization is successful, the ProSe Function 804 may assign a temporary ProSe WTRU ID to the WTRU 802. For example, the ProSe Function 804 may assign separate ProSe WTRU IDs per Restricted ProSe Application ID, or per application. In another example, the ProSe Function 804 may assign on temporary ProSe WTRU identity per WTRU.

The ProSe Function 804 may send a ProSe Registration request 818 to the ProSe Application Server 808 over the PC2 reference point. The ProSe Registration request 818 may include, but is not limited to include, any of the following: the Restricted ProSe Application ID; and/or the ProSe WTRU ID. The ProSe Application server 808 may link the Restricted ProSe Application ID with the temporary 3GPP identifier (ProSe WTRU ID). The ProSe Function 804 may send a ProSe registration acknowledgement 820 to the WTRU 802 over PC3 reference point, where the registration acknowledgment 820 may include the assigned ProSe WTRU ID.

According to an example, a WTRU may send a request to the ProSe Function to query if a user, group of user and/or service is nearby. According to this approach, a WTRU may send a request to the ProSe Function in order to identify if a user, a group of users, or a service is nearby. In Model B discovery, the WTRU may obtain a ProSe Application Code that may be known to WTRUs that are targeted for discovery, for example. In the announce request message, the user associated with the announcing WTRU may request to announce a code for Model B discovery. Such a procedure may include the ProSe Function verifying the request announce request with the ProSe Application Server over PC2 reference point. The WTRU may include, but is not limited to include, in the announce request message, any of the following: the Restricted ProSe Application ID of the group or the user to be discovered (e.g. as configured by the ProSe Application); the application ID; the user identity (e.g. IMSI, MSISDN); information indicating that the request is for announcing a Model B code; and/or the ProSe WTRU ID assigned by the ProSe Function.

If the user is authorized for restricted discovery (e.g. based on information provided by HSS), the ProSe Function may contact the ProSe Application Server over the PC2 reference point to verify that the Restricted ProSe Application ID is valid. The ProSe Function may also include the ProSe WTRU ID provided by the WTRU. The ProSe Application Server may check whether the user of the ProSe WTRU ID may discover the user of the Restricted ProSe Application ID. Instead of or in addition to sending the ProSe WTRU ID over the PC2 reference point to the ProSe Application Server, the ProSe Function may derive the Restricted ProSe Application ID from the ProSe WTRU ID. For example, this approach may be used if the Prose Function assigns separate ProSe WTRU IDs per Restricted ProSe Application ID request. If the Restricted ProSe Application ID is valid, the ProSe Function may assign a ProSe Application Code and may provide it to the WTRU to announce.

According to an example, broadcasting and/or monitoring may be performed under Model B discovery. In an example, the ProSe WTRU ID and ProSe Application Code may be broadcasted in Model B discovery. The WTRU that requested Model B discovery may announce a ProSe Application Code and/or a temporary ProSe WTRU identity of the source WTRU. A monitoring WTRU that detects a ProSe Application Code for Model B discovery may send a match report to the ProSe function for verification.

Figure 9:
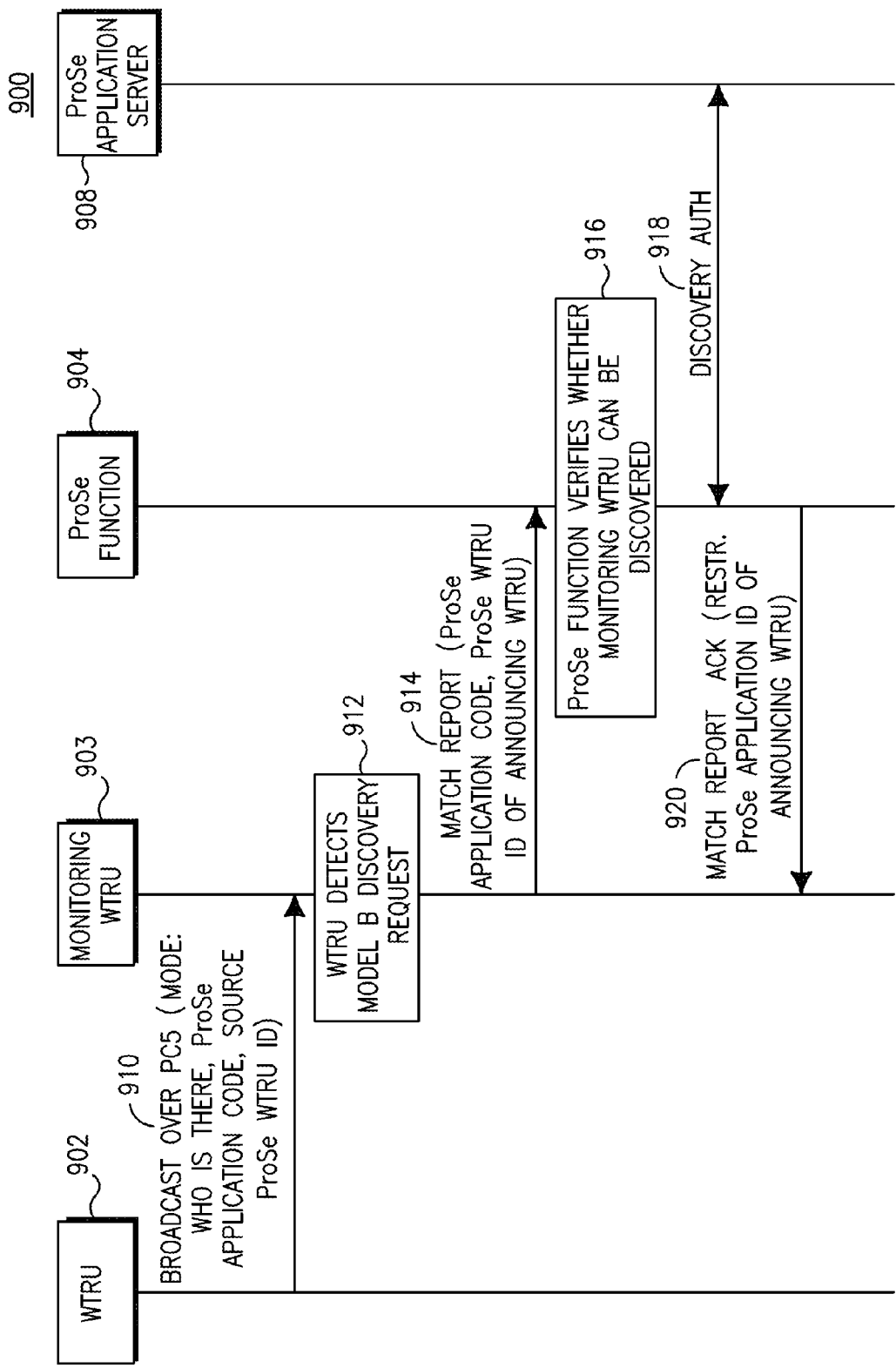
FIG. 9 is flow diagram of an example broadcasting and monitoring Model B discovery procedure.

FIG. 9 is flow diagram of an example broadcasting and monitoring Model B discovery procedure 900. The entities shown in the example of FIG. 9 may include, but or not limited to include, any of the following: WTRU 902; monitoring WTRU 903; ProSe Function 904; and/or ProSe Application Server 908. The WTRU 902 that requested a Model B discovery may broadcast a Model B announcement 910 that may include, but is not limited to include, any of the following: a ProSe Application Code; the source ProSe WTRU ID (i.e. of the WTRU 902); and/or an indication of the mode (e.g. "who is there" mode).

At 912, a monitoring WTRU 903 that may be in proximity to the source WTRU 902 may monitor the Model B discovery request broadcast message 910. The monitoring WTRU 903 may detect a known ProSe Application Code (e.g. the ProSe Application Code that the monitoring WTRU 903 announces) or a different ProSe Application Code. The monitoring WTRU 903 may report the match if the WTRU 903 detects a known ProSe Application Code. The monitoring WTRU 903 may report to the ProSe Function 904 any Model B ProSe Application Code that the monitoring WTRU 903 detects.

The monitoring WTRU 903 may send a Match Report 914 to the ProSe Function 904 over the PC3 reference point. The Match Report 914 may include, but is not limited to include, any of the following: the ProSe Application Code; and/or the ProSe WTRU ID received. At 916, the ProSe Function may derive the Restricted ProSe Application ID from the ProSe Application Code and may check whether announcing WTRU 902 may be allowed to discover the monitoring WTRU 903. The ProSe Function 904 may check with ProSe Application Server 908 whether the monitoring WTRU 903 may be discovered by announcing WTRU 902 by sending a discovery authorization message 918 over PC2 the reference point.

In an example, the ProSe Function 904 may provide to the ProSe Application Server 908 the Restricted ProSe Application ID (derived from the ProSe Application Code) and/or the ProSe WTRU ID of the announcing WTRU 902 in the discovery authorization message 918. In another example, the ProSe Function 904 may derive the Restricted ProSe Application ID from the ProSe WTRU ID. In that case, the ProSe Function may send the Restricted ProSe Application ID of the announcing WTRU 902 and the Restricted ProSe Application ID derived from the ProSe Application Code. If the monitoring WTRU 903 is allowed to be discovered by the announcing WTRU 902, the ProSe Function 904 may send a match report acknowledgement message 920 to provide the Restricted ProSe Application ID of the announcing WTRU 902 to the monitoring WTRU 903 over the PC3 reference point.

According to an example, the monitoring WTRU may respond with an "I am Here" message. If a match is successful, the monitoring WTRU may respond to the announcing WTRU that announced the Model B discovery that the announcing and monitoring WTRUs are in proximity. The monitoring WTRU may broadcast that a match is successful by rebroadcasting the ProSe Application Code indicating within the broadcast message that there may be a match and may include the temporary ProSe WTRU ID of the monitoring WTRU. The monitoring WTRU may include additional information such as proximity distance. The announcing WTRU that detects the code may send a match report to the ProSe Function to authenticate the ProSe WTRU ID of the monitoring WTRU.

According to an example, broadcasting and/or monitoring may be performed under Model B discovery using application assigned identifiers. For example, the WTRU may send a request to the ProSe Function in order to identify if a user, group of users and/or service is nearby. For example, in Model B discovery the WTRU may obtain a ProSe Application Code that may be known to WTRUs that are targeted for discovery. In the announce request, the user may request to announce a code for Model B discovery. The ProSe Function may verify the request with the ProSe Application Server over the PC2 reference point.

The WTRU may include, but is not limited to include, in the request any of the following: the Restricted ProSe Application ID of the user/group of users to be discovered (e.g. configured by the ProSe Application); the application ID; the user identity (e.g. IMSI, MSISDN); and/or information that the request may be for announcing a Model B code. If the user is authorized for restricted discovery (e.g. based on information provided by HSS), the ProSe Function may contact the ProSe Application Server over the PC2 reference point to verify that the Restricted ProSe Application ID may be valid.

If Authentication is successful, the ProSe Function may provide a ProSe Application Code for WTRU to broadcast. If the identifiers described above are used and if the WTRU has sent a request to identify a single user within a group, the ProSe Function may provide the full ProSe Application Code to the WTRU for broadcast. If the user requested to identify whether a group of users is nearby, the ProSe Function may provide a partial ProSe Application Code for the WTRU to announce, for example e. a ProSe Application Code up to Group ID may be included, and the user ID field may be wild carded. The ProSe Function may provide to the announcing WTRU the ProSe Application Code that a monitoring WTRU may use to respond to Model B requests in the Discovery Response message. In this case, the announcing WTRU may know whether a detected ProSe Application Code may be in reference to a Model B request.

According to an example, broadcasting and/or monitoring performed under model B discovery may include the monitoring WTRU sending all ProSe Application codes for model B discovery to the ProSe Function for verification. The WTRU that requested Model B discovery may announce a ProSe Application Code. A monitoring WTRU that detects a ProSe Application Code for Model B discovery may send a match report to the ProSe function for verification.

Figure 10:
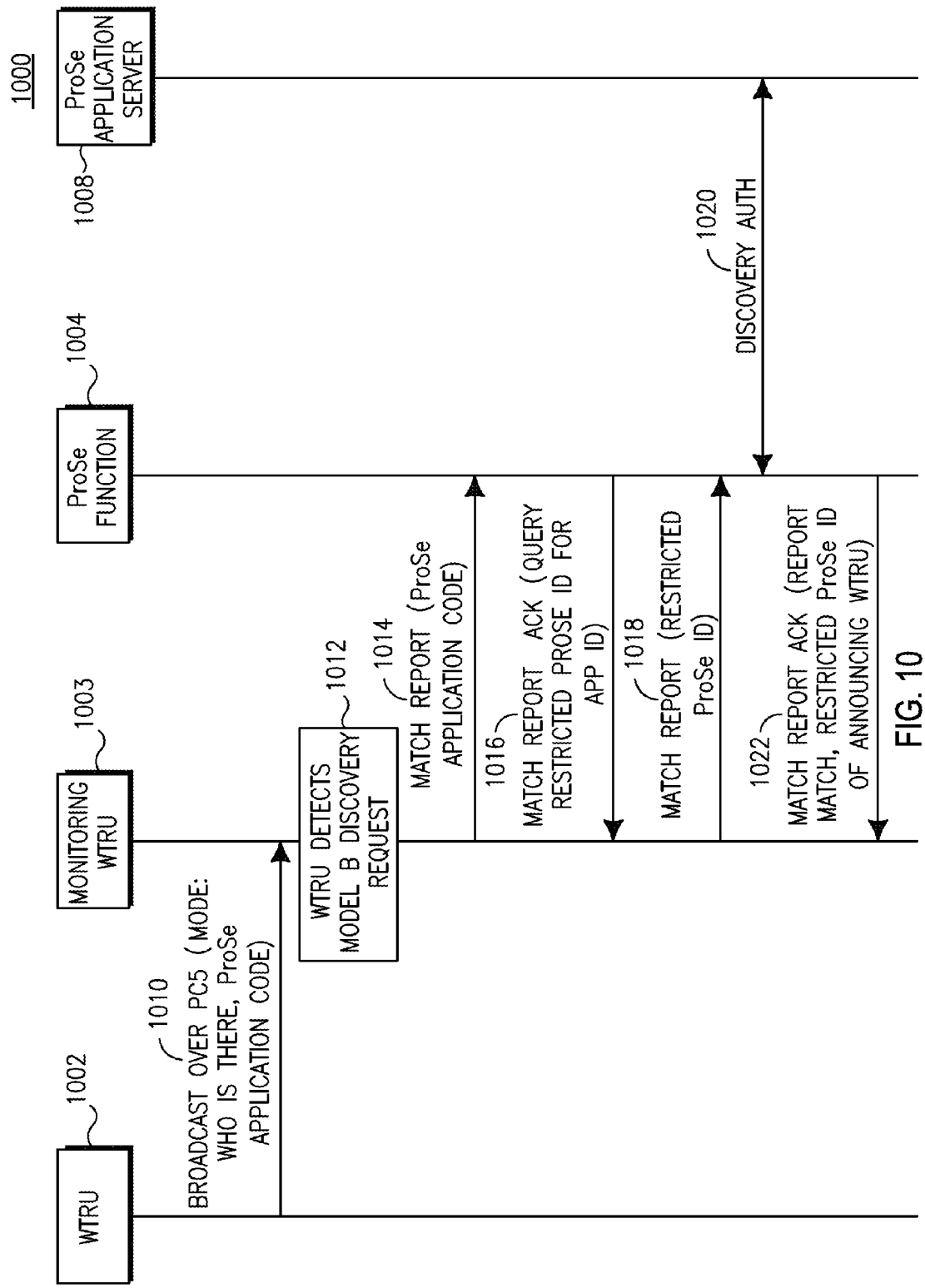
FIG. 10 is a flow diagram of another example broadcasting and monitoring Model B discovery procedure.

FIG. 10 is a flow diagram of another example broadcasting and monitoring Model B discovery procedure 1000. The WTRU 1002 that requested a Model B discovery may broadcast a Model B announcement message 1010 including a ProSe Application Code and/or identifying the mode. At 1012, a monitoring WTRU 1003 that may be in proximity to the WTRU 1002 may monitor for a Model B discovery request.

The monitoring WTRU 1003 may send a Match Report 1014 to the ProSe Function 1004 over the PC3 reference point providing the ProSe Application Code received from the WTRU 1002. The ProSe Function 1004 may derive the Restricted ProSe Application ID(s) from the received ProSe Application Code. The ProSe Function 1004 may send a Match Report acknowledgement message 1016 to the monitoring WTRU 1003 to query the monitoring WTRU 1003 to provide its Restricted ProSe Application ID for a particular application ID (the application ID may have been included in the ProSe Application Code). The monitoring WTRU 1003 may respond with a match report 1018, including the restricted ProSe ID.

At 1020, the ProSe Function may check (using discovery authorization) with the ProSe Application Server 1008 over the PC2 reference point about whether the monitoring WTRU 1003 may be discovered by the announcing WTRU 1002. For example, the ProSe Function 1004 may provide to the ProSe Application Server 1008 the Restricted ProSe Application IDs of the announcing WTRU 1002 and the monitoring WTRU 1003. If a match is detected, the ProSe Function 1004 may send a match report acknowledgment message 1022 to inform the monitoring WTRU 1003 of a match and may include the announcing WTRUs Restricted ProSe Application ID in the match report acknowledgment message 1022. In another example, the restricted ProSe Application ID may be sent when the monitoring WTRU sends a Match Report 1014.

In another example, the monitoring WTRU may send a monitoring request to monitor a ProSe Application Code for Model B discovery. The monitoring WTRU may be informed a priori of a ProSe Application Code regarding Model B discovery. When the monitoring WTRU sends a discovery request to announce a Model B broadcast, the monitoring WTRU may also send a Discovery Request to the ProSe Function in order to obtain the ProSe Application Code to monitor. The monitoring WTRU may be informed from the application layer that another WTRU has sent a model B discovery request to be informed of the whereabouts of the monitoring WTRU.

According to another example, a full match procedure may be used when the monitoring WTRU identifies the complete ProSe Application Code. For example, if the identifiers described above are used then both the code related to the group ID and the code related to the user id may match. If a match is successful, the monitoring WTRU may respond to the WTRU that announced the Model B discovery that the WTRU are in proximity.

In an example, the monitoring WTRU may respond to the announcing WTRU by re-announcing the ProSe Application Code indicating the match of the WTRUs as well as the ProSe WTRU ID of the monitoring WTRU. The monitoring WTRU may broadcast that a match is successful including the ProSe Application Code and/or the temporary ProSe WTRU ID of the monitoring WTRU. The announcing WTRU may respond back to the monitoring WTRU providing its ProSe WTRU ID.

The ProSe Function may provide to the monitoring WTRU a new ProSe Application Code to respond back to the announcing WTRU that initiated the Model B discovery. The monitoring WTRU may broadcast the new ProSe Application Code and may include a match indication. Once the announcing WTRU detects the new ProSe Application Code, the announcing WTRU may send a match report to the ProSe Function to verify whether a user or a group of users has responded back to the Model B request. The ProSe Function may provide to the announcing WTRU the ProSe Application Code that a monitoring WTRU uses in order to respond to a Model B request in a Discovery Response message. In this case, the announcing WTRU may know whether a ProSe Application Code detected references a Model B request. The monitoring WTRU may include additional information such as proximity distance.

In another example, a partial match procedure may be carried out when the user has requested whether a group of users may be nearby. In this case, the ProSe Application Code that a WTRU announces may provide information regarding the group of users (e.g. the user application ID part in the Restricted ProSe application ID may be wild carded). In a partial match approach, the announcing WTRU may identify the user identity of the user within the group that may be in proximity of the announcing WTRU.

Figure 11:
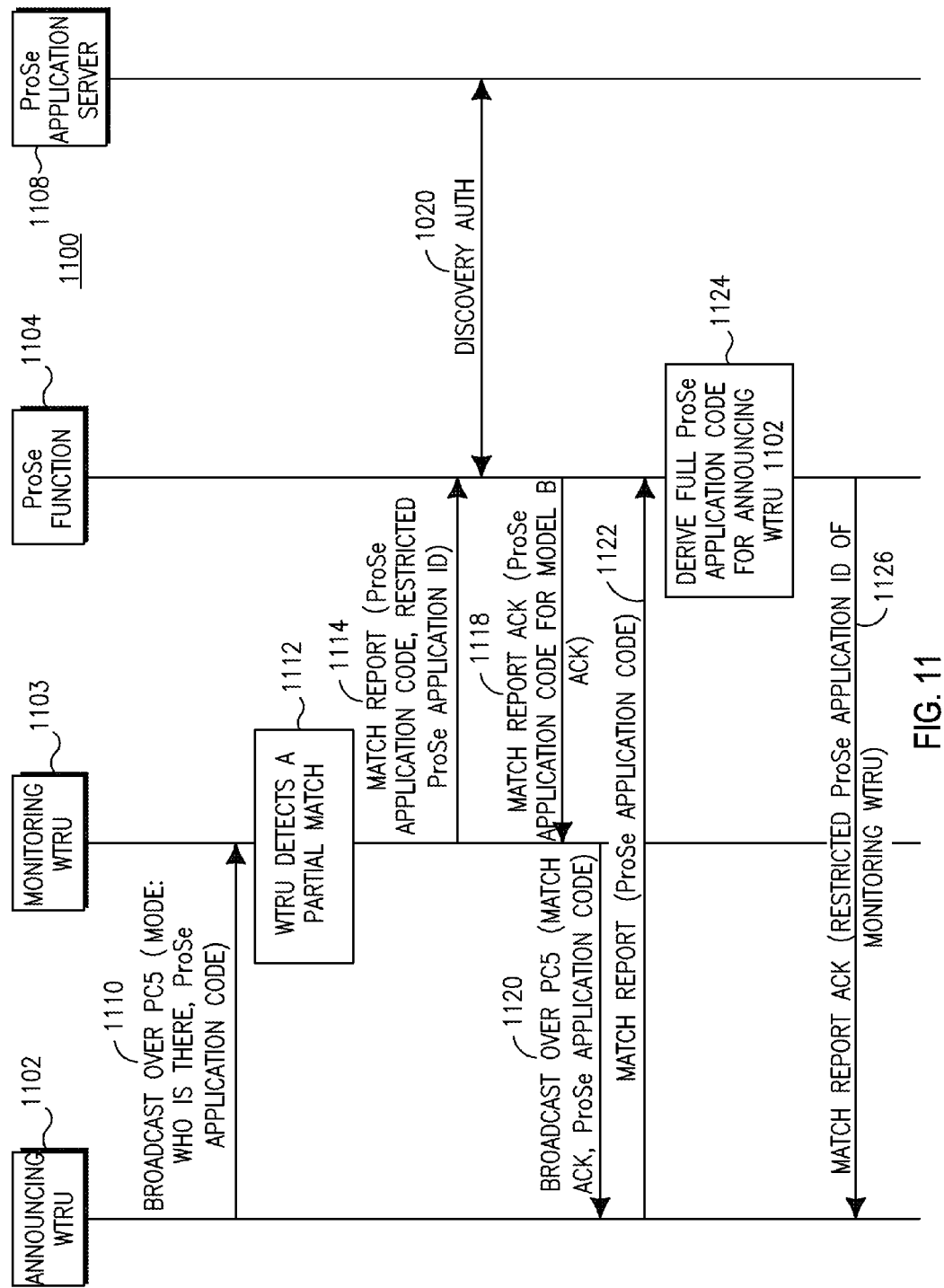
FIG. 11 is a flow diagram of an example partial procedure for ProSe discovery.

FIG. 11 is a flow diagram of an example partial procedure 1100 for ProSe discovery. The WTRU 1102 may send a broadcast message 1110 to announce a ProSe Application Code to identify if a group of users may be in proximity. At 1112, the monitoring WTRU 1103 may detect a known ProSe Application Code from the broadcast message 1110 for Model B discovery regarding a user or group of users as part of a partial match. The monitoring WTRU 1103 may send a match report 1114 to the ProSe Function 1104 that may include, but is not limited to include, any of the following: the ProSe Application Code of the group; and/or the monitoring WTRU's corresponding Restricted ProSe Application ID (providing information about the user of this group).

The ProSe Function 1104 may verify with ProSe Application Server 1108 whether the monitoring WTRU 1103 may be discovered from the announcing WTRU 1102 via a discovery authorization procedure 1116. If match is successful, the ProSe Function 1104 may generate a ProSe Application Code for the monitoring WTRU 1103 to respond to the announcing WTRU 1102, and provide the ProSe Application Code to the monitoring WTRU 1103 in match report acknowledgment 1118.

The monitoring WTRU 1103 may broadcast message 1120 over PC5 to the announcing WTRU 1102 and include a match acknowledgement and/or the ProSe Application Codes. The ProSe Function 1104 may provide to the announcing WTRU 1102 the ProSe Application Code that the monitoring WTRU 1103 may use to respond to a Model B request, which may be received, for example, from the ProSe Function 1104 in a Discovery Response message (not shown in FIG. 11). In this case, the announcing WTRU 1102 may know whether a ProSe Application Code detected may be in reference to a Model B request.

The announcing WTRU 1102 may send a match report 1122 to the ProSe Function 1104 over the reference point PC3 including the ProSe Application Code in order to derive the identity of the user. At 1124, the ProSe Function 1104 may drive the full ProSe Application Code for the announcing WTRU 1102. Via the match report acknowledgment 1126, the ProSe Function 1104 may provide to the announcing WTRU 1102 the identity of the monitoring WTRU 1103 (e.g. the Restricted ProSe Application ID of the monitoring WTRU 1103).

The example approaches described above may be used for Model B Restricted or Open discovery. A possible difference between open discovery and restricted discovery may be that open discovery may not use verification with the ProSe Application Server over the PC2 reference point.

Figure 12:
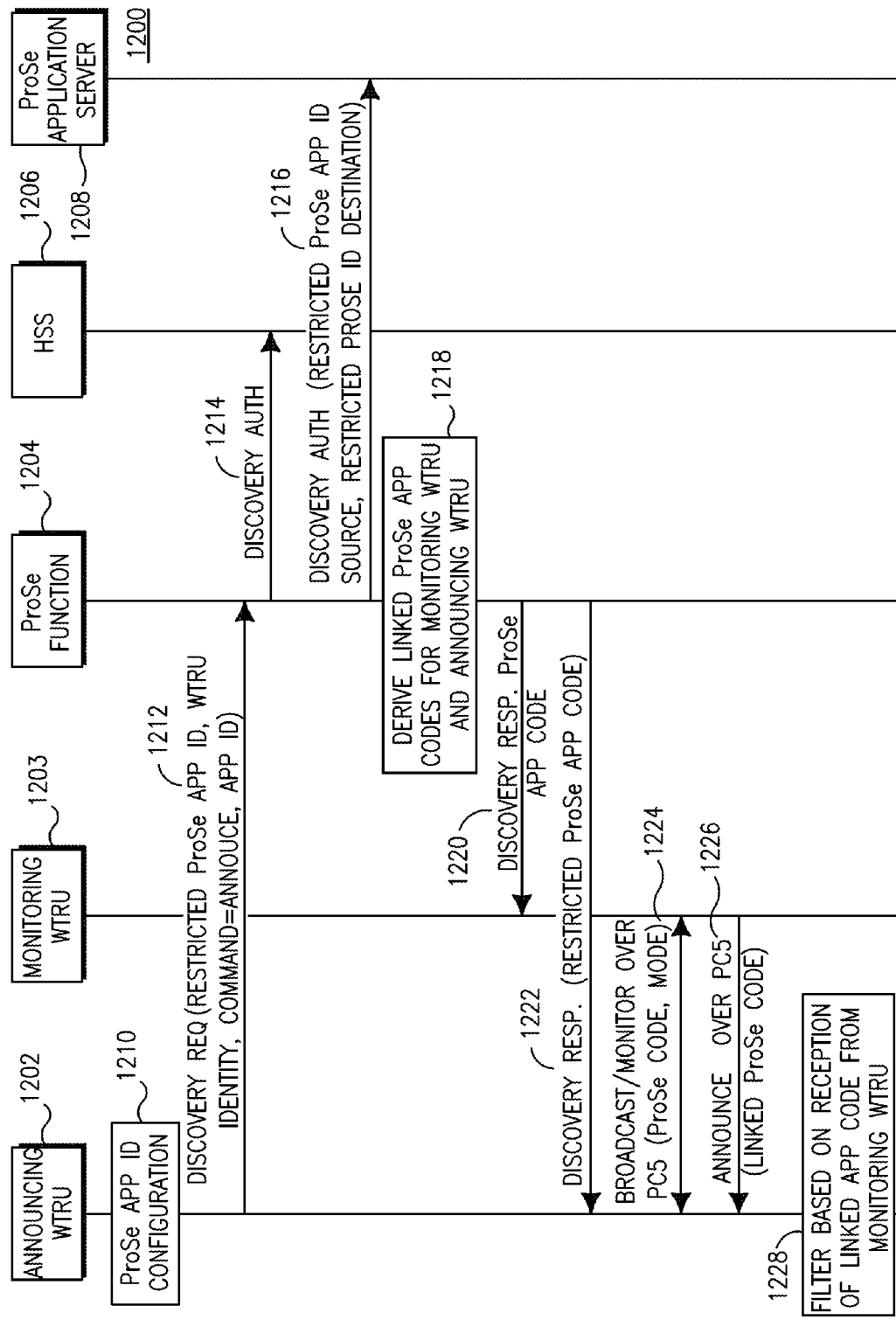
FIG. 12 is a flow diagram of an example Model B restricted discovery procedure employing optimized matching.

According to an example, an optimized matching mechanism may be used for Model B restricted discovery. When an announcing WTRU contacts specific WTRUs using a Model B approach, the announcing WTRU may unambiguously identify monitoring WTRUs that respond to an "are you there" code sequence broadcasted over the PC5 interface. For example, FIG. 12 is a flow diagram of an example Model B restricted discovery procedure 1200 employing optimized matching.

At 1210, an announcing (discoverer) WTRU 1202 may configure a ProSe Application ID for an application. The announcing (discoverer) WTRU 1202, using a Model B discovery approach, may send a discovery request message 1212 to request discovery of a group of WTRUs or specific WTRUs from within a group to the ProSe Function 1204. The announcing WTRU 1202 may provide the Restricted ProSe Application ID in the discovery request 1212. The announcing WTRU 1202 may contact the ProSe Function 1204 by sending the discovery request 1212 to the ProSe Function 1204 prior to announcing Model B discovery. The discovery request 1212 may also include, but is not limited to include, any of the following: the WTRU identity; the command (e.g. announce); and/or the application ID. The monitoring (discoveree) WTRU 1203 may send a discovery request message (not shown) similar to the discovery request message 1212 sent by the announcing WTRU 1202.

The ProSe Function 1204 may send a discovery authorization message 1214 to check with the HSS 1206 whether the user associated with announcing WTRU 1202 may be authorized for restricted ProSe discovery. The ProSe function 1204 may send a discovery authorization message 1216 to the ProSe Application Server 1208 to request verification of the restricted ProSe application IDs. At 1218, the ProSe Function 1204 may generate two ProSe Application Codes (i.e. ProSe Codes): one ProSe (Application) Code for the announcing WTRU 1202 and a linked ProSe (Application) Code for the monitoring WTRU(s) 1203. The two ProSe Application Codes may be linked together, such that a match between the two ProSe Application Codes may be determined using associated discovery filter(s). Any of the two ProSe Application Codes may be derived based on the Restricted ProSe Application ID. At 1218, the ProSe function 1204 may also generate the discovery filter(s) corresponding to the two ProSe Application Codes, as described above.

The ProSe Function 1204 may send a Discovery Response message 1220 to the monitoring WTRU(s) 1203 including the generated (linked) ProSe Application Code for the monitoring WTRU 1203. This may occur, for example, when an announcement linked to the ProSe Application Code or a discovery request from the monitoring WTRU 1203 is received at the ProSe Function 1204 or at any time during or after the ProSe discovery process. The ProSe Function 1204 may send a Discovery Response message 1222 to the announcing WTRU 1202 including the (Restricted) ProSe Application Code for the announcing WTRU 1202 in order to find matches with prospective monitoring WTRUs 1203. In the Discovery Response message 1222, the ProSe Function 1204 may provide to the announcing WTRU 1202 the linked ProSe Application Code for a monitoring WTRU 1203. In the Discovery Response messages 1220 and/or 1222, the ProSe Function 1204 may provide to the monitoring WTRU 1203 and/or the announcing WTRU 1202 the discovery filter(s) associated with the respective ProSe Application Codes.

At 1224, the announcing WTRU 1202 may broadcast over the PC5 interface announcement messages for monitoring WTRU(s) 1203 that may include a ProSe Application Code received from the ProSe Function 1204. The monitoring WTRU 1203 may monitor the PC5 interface and receive announcement messages from the announcing WTRU 1202. If the monitoring WTRU 1203 determines a match (using the discovery filters) in a received announcement message from the announcing WTRU 1202, the monitoring WTRU 1203 may send an announcement message 1226 over PC5, which may be received by the announcing WTRU 1202 that may be monitoring PC5. The announcement message 1226 may include the linked ProSe Application Code provided to the monitoring WTRU 1203 by the ProSe function 1204. At 1228, the announcing WTRU 1202 may use its received discovery filters to determine if there is a match between the linked ProSe Application Code received from monitoring WTRU 1203 and the ProSe Application Code received from the ProSe Function 1204, so that Model B discovery may be enabled between the WTRUs 1202 and 1203. The announcing WTRU 1202 may send a match report (not shown in FIG. 12; see match report 1122 in FIG. 11 for example) to the ProSe function 1204 to confirm the match.

According to an example, Model B Discovery over a ProSe communication plane (e.g. a user plane) may be enabled. Model B discovery may have more information to be sent over the air than other open discovery methods. In this case, it may be undesirable to further change the format for the LTE medium access control (MAC) header or protocol data unit (PDU) in order to differentiate Model B discovery messages from other messages such as open discovery messages or ProSe user plane data. Thus, Model B discovery may be enabled over the communication plane. For example, a WTRU may use the MAC PDU that is used for communication for Model B service discovery. To achieve this, a WTRU that is transmitting an announcement message (e.g. "who is out there" or "are you out there") may set the source ID of the MAC frame to its own source ID, which may be a ProSe WTRU ID or any other ID, for example. In this case, the destination ID field may be set to a pre-defined value (and may be within a pre-defined range) such that the pre-defined value may indicate that the announcement message is a Model B discovery and all recipient WTRUs may process the request associated with the announcement message. In an example, the discovery content may be transmitted in the data or payload portion of the MAC frame.

A monitoring (discoveree) WTRU that receives the Model B announcement (or request) message and sees the destination ID set to a pre-defined value and/or with a pre-defined range may process the contents of the message, including for example the data or payload portion of the message. If the monitoring WTRU responds, for example based on the processing of the discovery message content, then the monitoring WTRU may set the source ID in its response message to its own source ID and the destination ID to that of the announcing WTRU, which may be retrieved from the received message. The pre-defined values and/or ranges for the destination ID field may be provided to the WTRU via the application, or via interaction with the ProSe Function using procedures discovery requests, for example.

In an example, Model B discovery may be enabled without interaction with the ProSe function. Model B discovery, as described above, may use the ProSe Function to authorize discovery requests and/or receive other information in order to complete the discovery procedures. However, it may be desirable to achieve Model B discovery without interaction with the ProSe Function so that signaling may be reduced. For example, signaling can be reduced or eliminated such as NAS signaling to transition to connected mode to obtain an IP connection with the ProSe Function. Another reason why it may be desirable to perform Model B discovery without interaction with the ProSe Function may be the out of coverage scenarios in which no E-UTRAN is available and hence no IP connection may be set up with a ProSe Function. Approaches for Model B discovery without use of ProSe Function are described below, which may be used if the WTRU is in or out of coverage.

In the following examples, the following assumptions may be made: WTRUs (e.g. two or more) may be participating in Model B discovery and may have a shared security parameter set (which may be the same as another predefined security parameter set), which may be preconfigured in the WTRUs or provided by the ProSe Function; the WTRUs may be preconfigured with a specific group ID that may be provided via the ProSe Function; the group ID may be an input to the security algorithm; and/or "Challenge" and "Response" IEs may be configured in all WTRUs or may be provided by the ProSe Function.

According to an example, in order to transmit Model B discovery, an announcing WTRU may encrypt the group ID and may send a discovery message over the air. The discovery message may indicate that the discovery message is a Model B discovery request. This may be done by changes in the RAN protocols (e.g. MAC) or may be done over the communication channel as described above.

According to an example, the Group ID and/or other parameters may be encrypted. The recipient WTRU may decrypt the encrypted data and verify the result. If the result matches any of its group IDs that it may be a member of, the monitoring WTRU may take any of the following actions: the WTRU may include a time stamp in reference to the time in which the discovery message was received, which may help the announcing WTRU know which discovery request is being responded to, and may involve the announcing WTRU keeping track of the time at which it sends a particular message for Model B discovery; the WTRU may encrypt the group ID; and/or the WTRU may send a "Challenge" IE in its response, which may be used by the announcing WTRU to input to a security algorithm and respond with a "Response" IE.

When the announcing WTRU receives a response, the announcing WTRU may take any of the following actions: the announcing WTRU may verify the time stamp in reference to the discovery message that was initially sent and may map this response to the initial discovery request sent;

the announcing WTRU may verify the group ID to ensure it is the correct group ID, may do so by decrypting the encrypted group ID IE and the result may match the group ID that it may be part of; the announcing WTRU may use the "Challenge IE" in a security algorithm to generate a Response IE; and/or the WTRU may send back another message with a Response IE and may include a Challenge IE for the monitoring WTRU to use and respond.

The monitoring WTRU may receive a response and may take any of the following actions: the monitoring WTRU may verify the Response IE to see if it matches the same response it has locally, and if so, the monitoring WTRU may continue with the discovery procedure, or otherwise discard the message; and/or the monitoring WTRU may use the Challenge IE to generate a Response IE and may send it back to the announcing WTRU.

The announcing WTRU may receive a message with a "Response" IE and if this matches the "Response" IE that the WTRU has, then the discovery process completes. Both WTRUs may then establish a connection and optionally share their individual IDs over a secure connection.

According to an example, the Group ID may be not encrypted. In this case, the first message sent by the announcing WTRU may have a group ID that may be not encrypted. However, the discovery request may contain a Challenge IE and the recipient WTRU (e.g. if it belongs to the same group where there may be a partial or full match with respect to the group ID or the received code) may then respond with a Response IE. The monitoring WTRU may generate a Challenge IE and respond to the announcing WTRU with the Response parameter and/or Challenge parameters.

At the monitoring WTRU, the Response IE may be verified. If the Response IE matches a Response IE in the WTRU, then the monitoring WTRU may continue the discovery procedure, or otherwise the discovery message may be discarded. If there is a match, the announcing WTRU may respond to the Challenge IE using example procedures described above and may respond to the monitoring WTRU. Similarly, the monitoring WTRU may verify response IE for a match with its own Response IE. If there is a match then the discovery procedure may complete and the WTRUs may establish a secure connection and may exchange identities about their individual users.

In an example, methods may be used for restricted discovery revocation. For example, discovery revocation may be made via a PC2 reference point. A WTRU may revoke permission to another WTRU or a group of WTRUs in the ProSe Application. For example, the ProSe Application may indicate via a PC2 reference point a restricted discovery revocation to the ProSe Function. The ProSe Application may indicate revocation of the ProSe Function in various methods including, but not limited to, any of the following: the ProSe Application Server may identify revoked WTRUs and may send updated monitoring discovery lists of such WTRUs to ProSe Function; and/or the ProSe Application (App) Server may send a list of revoked WTRUs of an announcing WTRU.

According to an example method for indicating revocation of the ProSe Function, the ProSe App Server may provide a list of revoked WTRUs and/or their updated permitted discovery list to the ProSe Function. The ProSe App Server may provide identifiers of the revoked WTRU(s) (e.g. by providing the pair of ProSe Discovery WTRU ID and ProSe Application User ID) and/or respective updated lists of WTRU(s) that allow discovery by the revoked WTRUs (e.g. by providing the pair of Target ProSe Discovery WTRU ID and Target ProSe Application User ID).

The ProSe Function may use the received information to identify the monitoring WTRUs that are to be provided with updated ProSe Codes that may be monitored. The ProSe Function may retrieve the ProSe Codes of the revoked and authorized WTRUs and may push new discovery filters to the Monitoring WTRUs that were de-authorized by an announcing WTRU. The ProSe Function may provide updated ProSe Codes to the monitoring WTRUs and/or may provide the revoked codes setting their time to live (TTL) indication to zero. The monitoring WTRU may discard the unused codes or the codes that have a TTL set to zero.

The monitoring WTRU may compare the entry for discovery filter and ProSe code received previously during the discovery request for monitoring procedure and update the discovery filter (including, for example, the ProSe Code, ProSe mask, and/or TTL) with the new discovery filter information, such as a new TTL or indication to delete/revoke the previously received discovery filter. The ProSe Function may provide a new ProSe Mask to the ProSe Code(s) that have expired.

Figure 13:
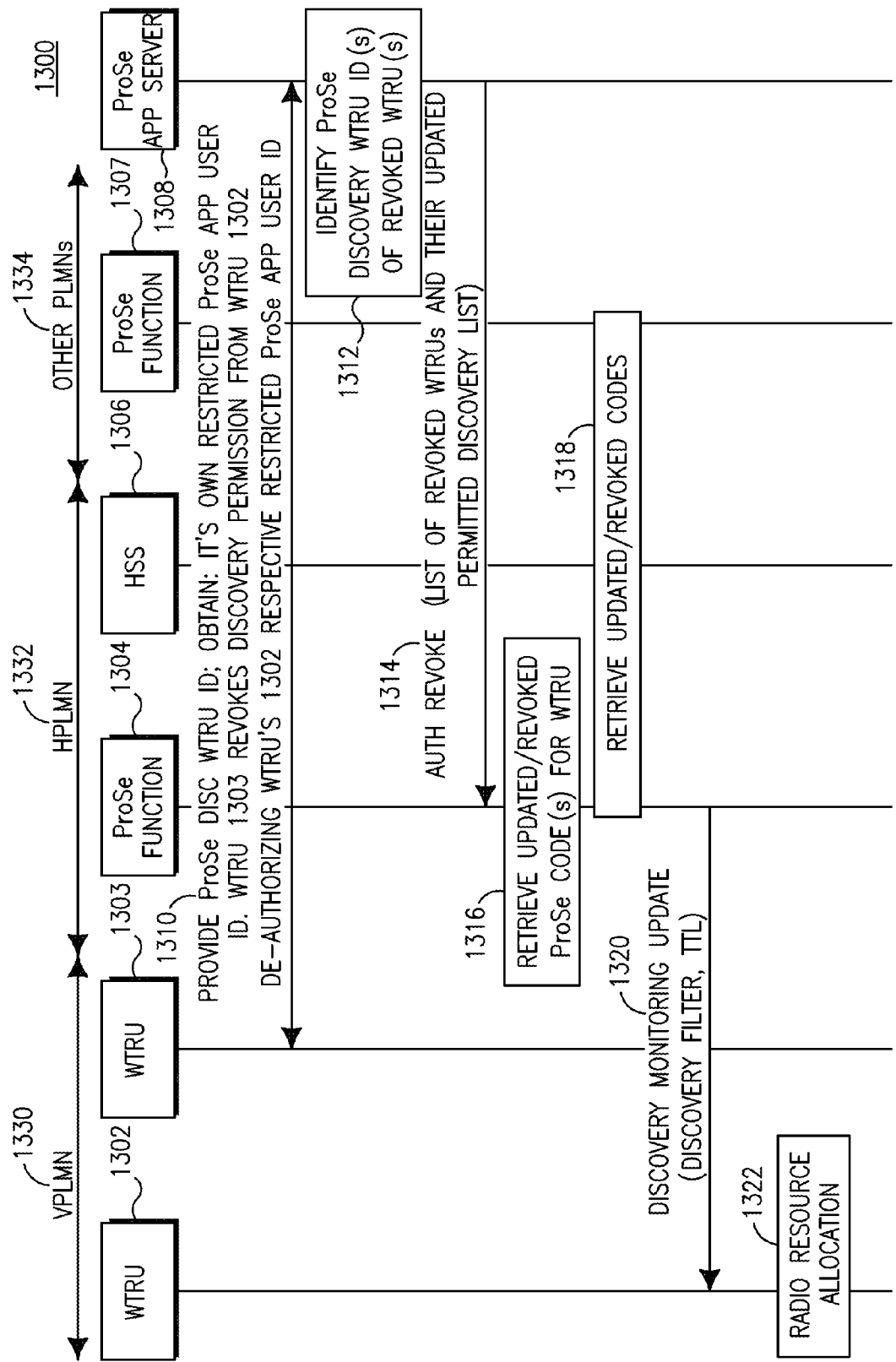
FIG. 13 is a flow diagram for an example restricted discovery revocation procedure.

FIG. 13 is a flow diagram for an example restricted discovery revocation procedure 1300. The user of WTRU 1303, which may be an announcing WTRU, may send a revocation message 1310 to the ProSe Application server 1308 to revoke discovery permission from WTRU 1302 (or from a group of WTRUs), which may be a monitoring WTRU. WTRU 1303 may revoke permission in the application by providing the respective Restricted ProSe Application User ID(s) of the de-authorized WTRUs 1302 to the ProSe Application Server 1308 via revocation message 1310 (which may include an exchange of messages). At 1310, WTRU 1302 may communicate with the Application Server 1308 to inform it that it wants to change the user's setting with respect to who can discovery the user/WTRU 1302. In the process of 1310, the WTRU 1301 may provide the ProSe Discovery ID to the Application Server 1308 and/or may obtain form the Application Server 1308 the Restricted ProSe ID.

At 1312, the ProSe Application Server 1308 may identify the revoked WTRU(s) 1302 and may obtain the ProSe Discovery WTRU ID(s) of the revoked WTRU(s) 1302. The ProSe Application Server 1308 may send an authorization to revoke message 1314 to the ProSe Function 1304 to provide the identity of the revoked WTRU 1302 via PC2. For example, the ProSe Application Server 1308 may provide the Revoked ProSe Discovery WTRU ID and/or the Restricted ProSe App User ID of the revoked WTRU 1302 and/or an updated list of users/WTRU(s) authorized for discovery for the revoked WTRU 1302 (e.g. by providing N pairs of Target ProSe Disc WTRU ID and Target Restricted ProSe App User ID).

If WTRU 1303 has de-authorized more than one user, the ProSe App Server 1308 may provide multiple identities of revoked WTRUs within a single authorization to revoke message 1314 or may send multiple authorization to revoke messages or commands 1314 to the ProSe Function 1304. Moreover, the ProSe App Server 1308 may contact multiple ProSe Functions 1304 and 1307 because the monitoring WTRUs 1302 may be served by different ProSe Functions 1304 and 1307 (e.g. each monitoring WTRU may belong to a different subscription from a different operator).

At 1316, the ProSe Function 1304 may retrieve the ProSe Code(s) of the revoked WTRU(s) 1302 and any authorized WTRU(s) (not shown). The ProSe Function 1307 may also update the permitted monitoring discovery list of the revoked WTRU(s) 1302 by removing the identifier of the revoking WTRU 1303 from the list. At 1318, if the ProSe Codes were assigned by a different ProSe Function (i.e. the Discovery WTRU ID belongs to a different PLMN 1334 and not the HPLMN 1332 of the ProSe Function 1304), the ProSe Function 1304 may retrieve the ProSe Code(s) from the other ProSe Function(s) (e.g. ProSe Function 1307) that assigned the Code, using methods described above.

The ProSe Function 1304 may send a discovery monitoring update message 1320 to the monitoring WTRU(s) 1302 that are not authorized to discover the announcing WTRU 1303. The discovery monitoring update message 1320 may include, but is not limited to include, any of the following: a Discovery Filter and/or a TTL. The ProSe Function 1304 may provide to the monitoring WTRUs the updated code lists of the users that such WTRUs are permitted to be discovered by, and/or may provide to such WTRUs the revoked codes while setting the TTL of the revoked codes to zero so that the WTRUs may discard them. The ProSe Function 1304 may provide to the monitoring WTRUs 1302 a new ProSe Mask for the de-authorized ProSe Code(s). At 1322, the monitoring WTRU(s) 1302 may discard the ProSe Code(s) that were revoked by the user of WTRU 1303.

Figure 14:
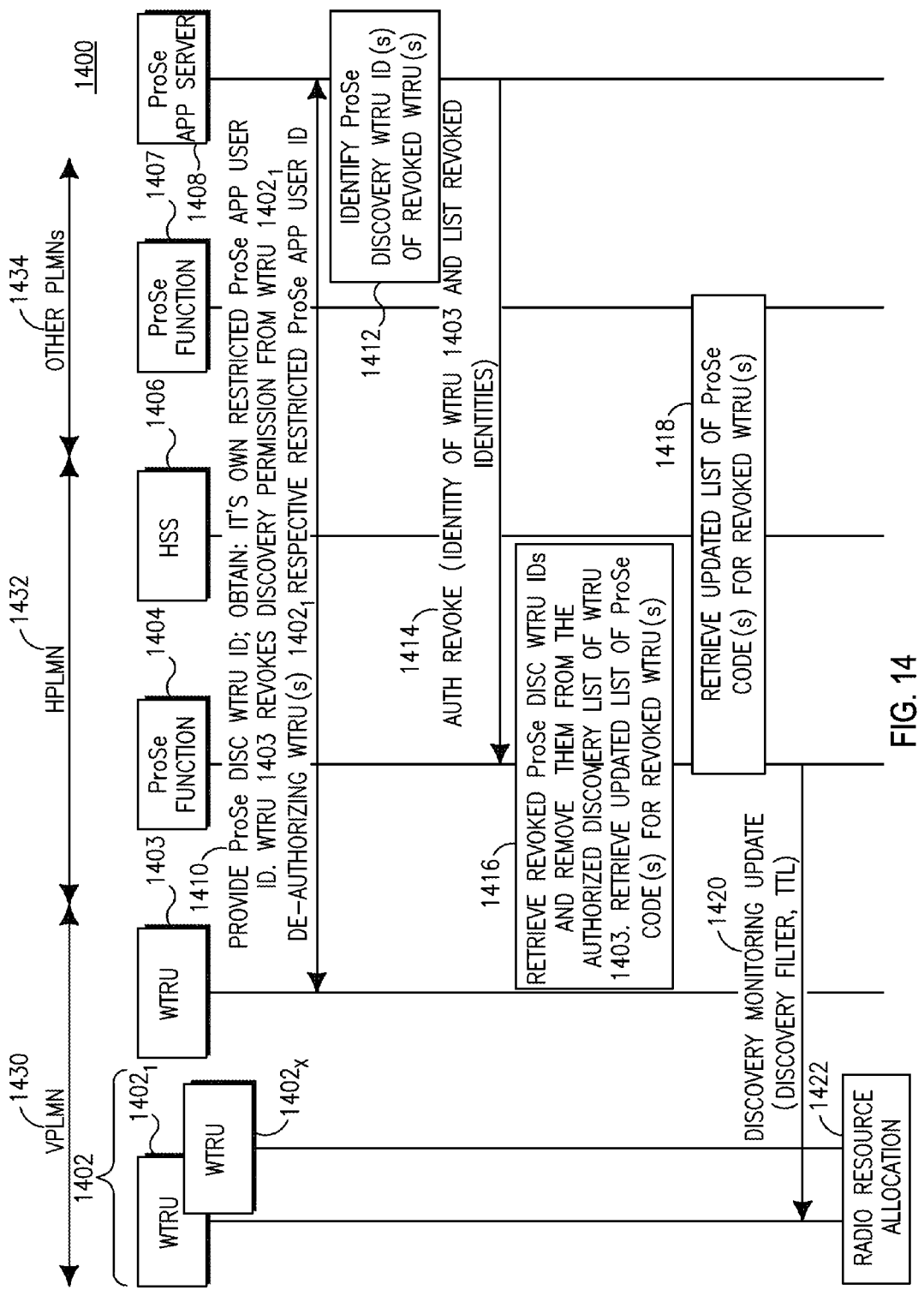
FIG. 14 is a flow diagram for another example restricted discovery revocation procedure.

FIG. 14 is a flow diagram for another example restricted discovery revocation procedure 1400. At 1410, the user of WTRU 1403, which may be an announcing WTRU, may revoke discovery permission from WTRU 1402 (or from a group of WTRUs $1402_1 \ldots 1402_x$), which may be a monitoring WTRU. WTRU 1403 may revoke permission in the application by providing the respective Restricted ProSe Application User ID(s) of the de-authorized WTRU(s) 1402 to the ProSe Application Server 1408.

At 1412, the ProSe Application Server 1408 may identify the revoked WTRU(s) 1402 and may obtain the ProSe Discovery WTRU ID(s) of the revoked WTRU(s) 1402. The ProSe Application Server 1408 may send an authorization revoked message 1414 to the ProSe Function 1404 to provide the identity of the revoked WTRU 1302 via PC2. For example, the ProSe Application Server 1408 may provide the Revoked ProSe Discovery WTRU ID and/or the Restricted ProSe App User ID of the revoked WTRU 1402 and/or an updated list of users/WTRU(s) authorized for discovery for the revoked WTRU 1402 (e.g. by providing N pairs of Target ProSe Disc WTRU ID and Target Restricted ProSe App User ID).

If WTRU 1403 has de-authorized more than one user, the ProSe App Server 1408 may provide multiple identities of revoked WTRUs within a single Authorization Revoke message 1414 or may send multiple Authorization Revoke messages or commands 1414 to the ProSe Function 1404. Moreover, the ProSe App Server 1408 may contact multiple ProSe Functions 1404 and 1407 because the monitoring WTRUs 1402 may be served by different ProSe Functions 1404 and 1407 (e.g. each monitoring WTRU 1402 may belong to a different subscription from a different operator).

At 1416, the ProSe Function 1404 may retrieve an updated list of the ProSe Code(s) of the revoked and the authorized WTRU(s) 1402. The ProSe Function 1404 may update the authorized monitoring discovery list by removing from the list the identifier (e.g. and/ProSe Discovery WTRU IDs) of the revoked WTRUs 1402. If the ProSe Codes were assigned by a different ProSe Function other than ProSe Function 1404, the ProSe Function 1404 may contact the ProSe other Function (e.g. ProSe Function 1407) that assigned the code in order to obtain the updated/revoked codes.

At 1418, if the Discovery WTRU ID(s) were assigned by a different ProSe Function, the ProSe Function 1404 may retrieve the ProSe Code(s) from the different ProSe Functions 1407 that assigned the ProSe Code(s), using approaches described herein. The HPLMN 1432 ProSe Function 1404 of the monitoring WTRU 1403 may send a discovery monitoring update message 1420 to the monitoring WTRUs 1402 that are not authorized to discover the announcing WTRU 1403 to provide a Discovery Filter and/or TTL.

The ProSe Function 1404 may provide to WTRUs 1402 only the updated code lists of the users that WTRUs 1402 are permitted to be discovered or may provide to WTRUs 1402 the revoked codes setting the TTL of the revoked code to zero so that the WTRUs may discard them, or the ProSe Function 1404 may provide a new ProSe Mask for the de-authorized ProSe Code(s). If a new discovery mask is provided then the mask may be such that applying the mask would not provide a partial match to the ProSe application code being revoked. At 1422, the monitoring WTRUs 1402 may discard the ProSe Code(s) that were revoked by the user of WTRU 1403.

According to an example, the ProSe App Server may send a list of revoked WTRUs of an announcing WTRU. The ProSe App Server may send an authorization revocation indication to the ProSe Function providing information about the WTRU that changed its discovery permissions as well as information regarding the updated (or revoked) WTRUs (e.g. by providing a list of N pairs of Target ProSe Discovery (Disc) WTRU ID And Target ProSe App User ID.

In an example, the ProSe Function may retrieve revoked ProSe Discovery WTRU IDs of revoked WTRUs and may remove them from the authorized discovery list of the announcing (revoking) WTRU and may retrieve an updated list of ProSe Codes for the revoked WTRU(s). In another example, the ProSe Function may retrieve the ProSe Codes of the revoked and authorized WTRUs and may push new discovery filters to the monitoring WTRUs that were de-authorized by an announcing WTRU. The ProSe Function may provide updated ProSe Codes to the monitoring WTRUs or may provide the revoked codes setting their TTL to zero. The monitoring WTRUs may discard the unused codes or the codes that have TTL set to zero. In an example, the ProSe Function may provide a new ProSe Mask for the de-authorized ProSe Code(s).

In order to reduce the signaling burden over the air, if the ProSe Function detects that multiple WTRUs were de-authorized from an announcing WTRU, the ProSe Function may indicate to the announcing WTRU to stop transmitting the ProSe Code that is by the de-authorized WTRUs. The ProSe Function in such a case may set the TTL of the ProSe Code of the announcing WTRU to zero. The announcing WTRU may then request a new ProSe Code. The monitoring WTRUs may obtain new ProSe Codes when the TTL of the revoked codes expire, and/or the ProSe Function may push the new ProSe Code to monitoring WTRU(S) authorized to discover the announcing WTRU.

Figure 15:
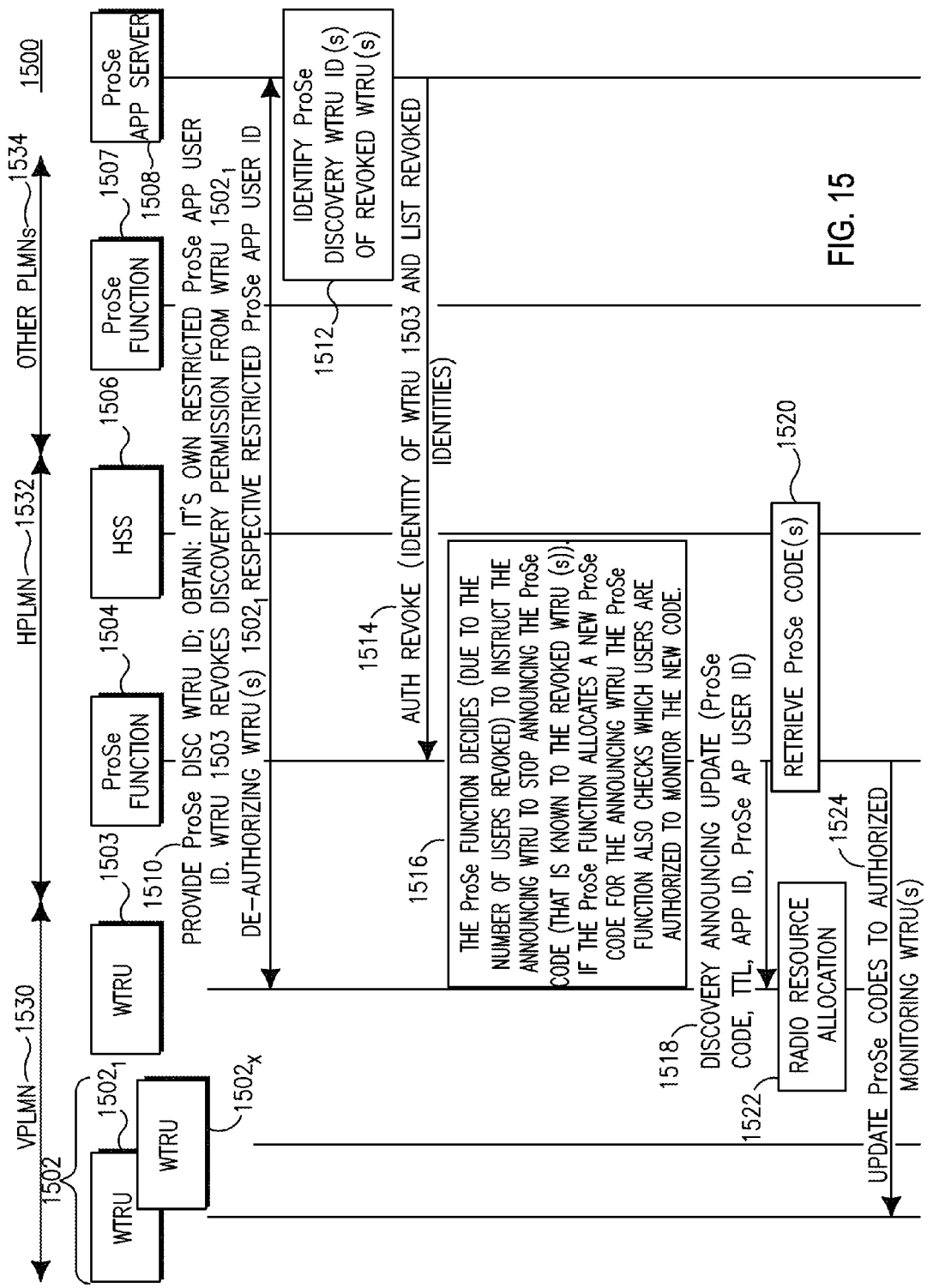
FIG. 15 is a flow diagram for another example restricted discovery revocation procedure.

FIG. 15 is a flow diagram for another example restricted discovery revocation procedure 1500. At 1510, the user of WTRU 1503, which may be an announcing WTRU, may revoke discovery permission from WTRU 1502 (or from a group of WTRUs $1502_1 \ldots 1502_x$), which may be a monitoring WTRU. WTRU 1503 may revoke permission in the application by providing the respective Restricted ProSe Application User ID(s) of the de-authorized WTRUs 1502 to the ProSe Application Server 1508.

At 1512, the ProSe Application Server 1508 may identify the revoked WTRU(s) 1502 and may obtain the ProSe Discovery WTRU ID(s) of the revoked WTRU(s) 1502. The ProSe Application Server 1508 may send an authorization revoked message 1514 to the ProSe Function 1504 via PC2 the identity of the announcing WTRU 1503 (that changed its permitted discovery list) and a list of user(s)/revoked WTRU(s) 1502. For example, the ProSe Application Server 1508 may provide a list of the Discovery WTRU ID and Restricted ProSe App User ID of WTRU 1503 of the revoked WTRUs 1502 and/or a list of Revoked ProSe Discovery WTRU ID(s) and/or Restricted ProSe App User ID(s) of the revoked WTRU(s) 1502. The ProSe App server 1508 may provide an updated list of users/WTRU(s) authorized for discovery for each revoked WTRU 1502 (e.g. by providing N pairs of Target ProSe Disc WTRU ID and Target Restricted ProSe App User ID). A single or multiple Authorization Revoke message 1514 may be sent to the ProSe Function 1504 (or multiple ProSe Functions).

At 1516, the ProSe function 1504 may, based on the number of users revoked, instruct the announcing WTRU 1503 to stop announcing the ProSe Code that is known to the revoked WTRU(s) 1502. If the ProSe 1504 allocates a new ProSe Code for the announcing WTRU 1503, the ProSe function 1504 may check which users are authorized to monitor the new code.

The ProSe Function 1504 may send a Discovery Announcing Update message 1518 to the announcing WTRU 1503 to instruct the announcing WTRU 1503 to stop announcing the code by sending the ProSe Code and setting the TTL of that code to zero. The ProSe Function 1504 may also provide a new code to announce, the App ID, and/or the ProSe App User ID, for example. If the announcing WTRU 1503 is in the VPLMN 1530, the monitoring WTRU 1502 may request the ProSe function 1504 of the announcing WTRU 1503 for authorization for assigning a new ProSe code and the new ProSe code because the ProSe code may be assigned by the ProSe function 1504 of the announcing WTRU 1503.

At 1520, if the Discovery WTRU ID of the monitoring WTRU 1502 belongs to a different PLMN 1534, the ProSe Function 1504 may contact the ProSe Function 1507 of the different PLMN 1534 to obtain the ProSe codes, which may be done via the HSS 1506. At 1522, the announcing WTRU 1503 may start radio resource allocation in order to transmit the new ProSe code (if it was received) or to stop announcing a ProSe Code. The ProSe Function 1504 may decide to allocate a new ProSe code for the announcing WTRU 1503, and the ProSe Function may send an update message 1524 to inform the monitoring WTRUs 1502 authorized to discover the announcing WTRU 1503 of the new ProSe code to monitor. The update message 1524 may include updated Discovery Filters. In an example, monitoring WTRU(s) 1502 may obtain the new ProSe code when the TTL of the previous allocated ProSe code expires. The ProSe Function 1504 may provide new discovery filters to monitoring WTRU(s) 1502 that are not authorized to discover the announcing WTRU 1503. In such a case, the ProSe Function 1504 may set the TTL of such codes to zero or may send a new mask for such a code that invalidates them.

The ProSe function may choose from methods described above for indicating revocation of the ProSe Function. The decision may be based on the number WTRUs being revoked for discovery, for example. If there are a lot of WTRUs being revoked, the ProSe function may decide to use the approach that changes the ProSe code and may inform the monitoring WTRU(s) about the new ProSe code. The decision may be based on subscription parameters or the context that the ProSe function has from the announcing WTRU. The ProSe function may take into account the time to live of the ProSe Application code to make a decision for which revocation method to use, or whether the announcing and/or monitoring WTRUs are in the same PLMN or different PLMN.

According to an example, ProSe Code Revocation may occur via a PC3 reference point. In an example, the ProSe Code may be revoked at the monitoring WTRU. In this approach, the ProSe Function may instruct WTRU(s) that are no longer authorized to monitor the WTRU to stop monitoring the code.

Figure 16:
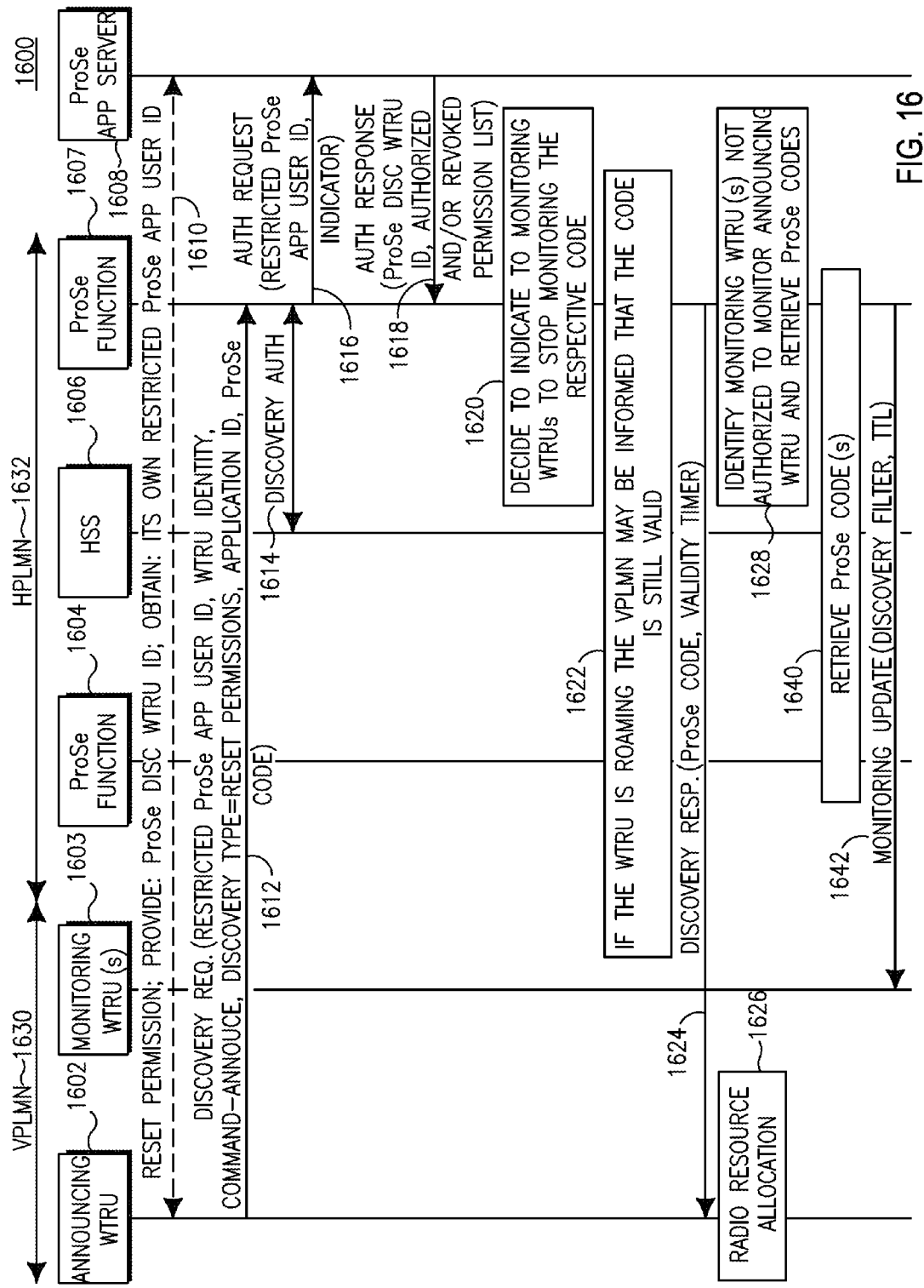
FIG. 16 is a flow diagram for another example restricted discovery revocation procedure.

FIG. 16 is a flow diagram for another example restricted discovery revocation procedure 1600. At 1610, the user of Announcing WTRU 1602 may decide to revoke permission to a WTRU 1603 (or to a group of WTRUs). The announcing WTRU 1602 may revoke the permission in the application by providing the Restricted ProSe App User IDs of the de-authorized WTRUs. The ProSe Application server 1608 may trigger the revocation without receiving the application layer signaling from the WTRU 1602.

The announcing WTRU 1602 may send a new Announce/Discovery Request message 1612 to the ProSe Function 1607. The Announce/Discovery Request message 1612 may include, but is not limited to include, any of the following: indication that the request is for an already authorized Announce Request; the Discovery Type to reset the permission; and/or the ProSe Code allocated in a previous announcing request.

At 1614 and 1616, The ProSe Function 1604 may verify with the Application Server 1608 whether the user is allowed to authorize and de-authorize a set of target WTRUs for restricted discovery. The ProSe Application Server 1608 may send an Authorization Response 1618 to the ProSe Function 1607 via PC2 to provide the identity of the announcing WTRU 1602 (that changed its permitted discovery list) and/or a list of authorized and/or revoked WTRU(s). One method to support such functionality may be by providing the Discovery WTRU ID and Restricted ProSe App User ID for WTRUs that are still authorized for discovery and a list of Revoked ProSe Discovery WTRU ID(s) and Restricted ProSe App User ID(s) of the revoked WTRU(s). The ProSe App server may also provide an updated list of users/WTRU(s) authorized for discovery for each revoked WTRU (by providing N pairs of Target ProSe Disc WTRU ID—Target Restricted ProSe App User ID).

At 1620, the ProSe Function 1607 may identify the users being revoked. Based on the number of users de-authorized, the ProSe Function may decide to instruct the announcing WTRU 1602 to stop announcing the ProSe code. At 1622, if the WTRU is roaming the ProSe Function 1607 may indicate to the ProSe Function 1604 in the VPLMN 1630 that the ProSe code may be not valid. The ProSe Function 1607 may send a Discovery response message 1624 to the announcing WTRU 1602 to indicate to the announcing WTRU 1602 to terminate announcement of a code. The discovery response message 1624 may include the ProSe code and/or a validity timer, for example.

At 1626, the announcing WTRU 1602 may start radio resource allocation in order to transmit the new ProSe code (if it was received) or to stop announcing a ProSe Code. The ProSe Function 1607 may inform the authorized monitoring WTRUs 1603 of the new ProSe code to monitor. The monitoring WTRU 1603 may obtain the new ProSe code when the TTL of the previous allocated code expires.

At 1628, the ProSe Function 1607 may check which users/WTRUs are not authorized to monitor the ProSe Code (by checking the authorized Discovery WTRU IDs from authorization response message 1618, for example) and may retrieve the authorized codes to monitor. At 1640, if the Discovery WTRU ID belongs to a different PLMN, the ProSe Function 1607 may contact the ProSe Function (e.g. ProSe Function 1604) that allocated the Discovery WTRU identity in order to retrieve the authorized codes to monitor. The ProSe Function 1607 may send a monitoring update message 1642 to the monitoring WTRUs 1603 to provide updated Discovery Filters and/or TTL. For the revoked WTRUs, the ProSe Function 1607 may set the TTL of the ProSe codes that are not permitted to monitor to zero or may provide a new mask that invalidates the code. If a new discovery mask is provided, the mask may be such that applying the mask would not provide a partial match to the ProSe application code being revoked.

According to another example of restricted discovery revocation via the PC3 reference point, a new ProSe Code may be assigned. In this approach, once the announcing WTRU changes the discovery permissions, the announcing WTRU may send a new Announce Request message to the ProSe Function including an updated discovery permission list. The ProSe Function may push the new code to the authorized WTRU and/or may send to the de-authorized WTRU a revocation indication as described above. If the ProSe Function provides a new code to the Announcing WTRU, procedures may be used for the announcing WTRU to receive a new code to announce for an application ID. Monitoring WTRUs may receive a new code once the TTL of a code stored in the monitoring WTRU expires.

Figure 17:
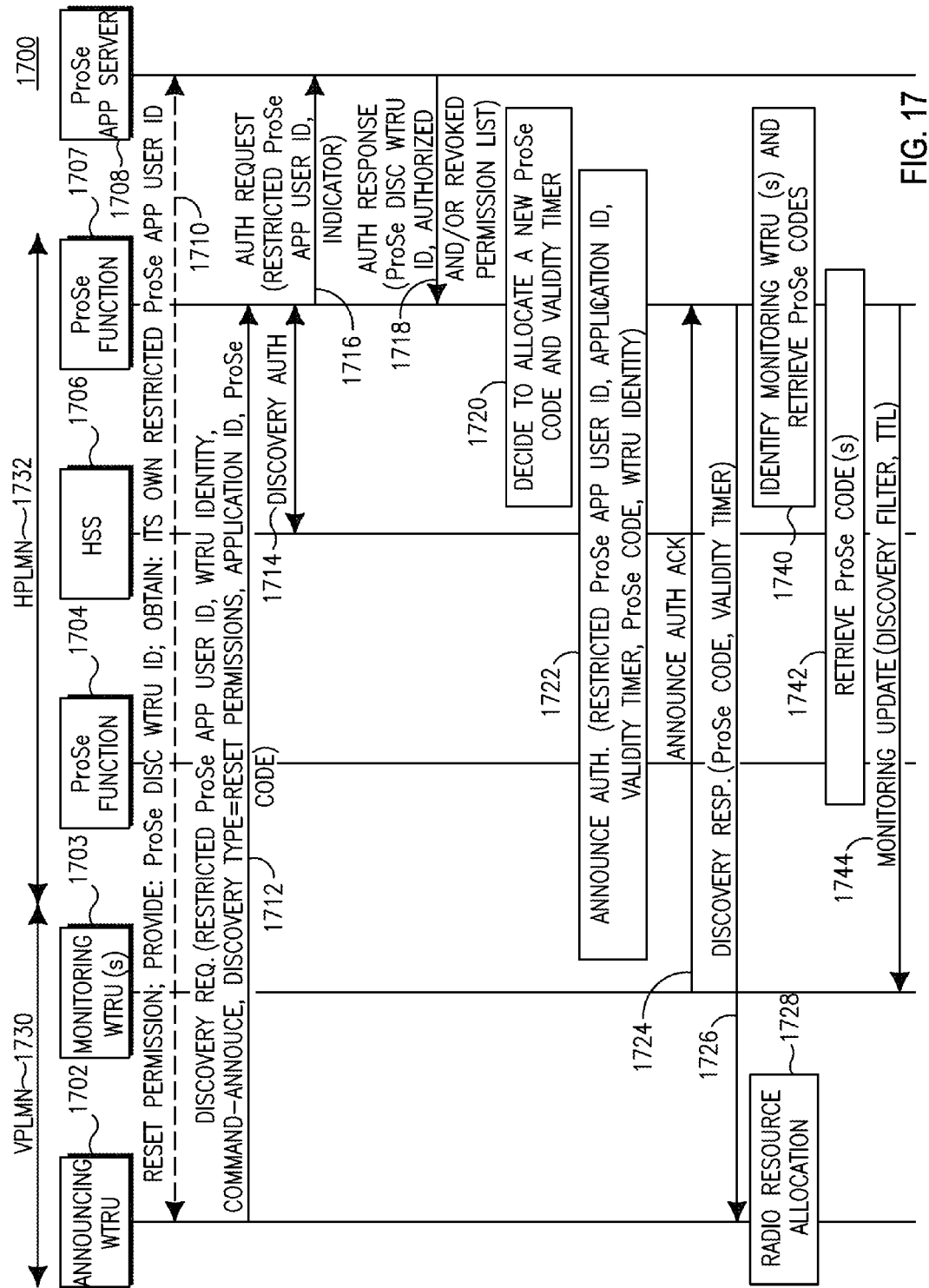
FIG. 17 is a flow diagram for another example restricted discovery revocation procedure.

In an example, the ProSe Function may provide a new code as well as information regarding the updated monitoring permission list and/or revoked permission list. FIG. 17 is a flow diagram for another example restricted discovery revocation procedure 1700. At 1710, the user of announcing WTRU 1702 may revoke permission to a monitoring WTRU 1703 (or to a group of WTRUs). The announcing WTRU 1702 may reset or revoke the permission in the application by providing the Restricted ProSe App User IDs of the de-authorized WTRUs 1703 to the ProSe App Server 1708.

The announcing WTRU 1702 may send an Announce/Discovery Request message 1712 to the ProSe Function 1707 indicating that the request is for an already authorized Announce Request. The Announce/Discovery Request message 1712 WTRU may include, but is not limited to include, any of the following: the Discovery Type set to reset the permission; the ProSe Code allocated in the previous announcing request; the Application ID, The Prose App User ID; the WTRU identity; and/or the command (e.g. announce). Discovery authorization 1714 between the HSS 1706 and the ProSe Function 1707 may be used to check if the user is allowed to use the ProSe discovery service.

The ProSe Function 1707 may send an authorization request 1716 (including, for example, the Restricted ProSe Application User ID) to the Application Server 1708 to determine which users/WTRUs are authorized or no longer authorized (revoked). The ProSe Application Server 1708 may send an authorization response message 1718 to provide via PC2 the identity of the announcing WTRU 1702 (that changed its permitted discovery list) and/or a list of authorized and/or revoked WTRU(s). This may include sending the Discovery WTRU ID and Restricted ProSe App User ID of WTRU 1702 and a list of Revoked ProSe Discovery WTRU ID(s) and Restricted ProSe App User ID(s) of the revoked WTRU(s). The ProSe App server 1708 may provide an updated list of users/WTRU(s) authorized for discovery for each revoked WTRU (by providing N pairs of Target ProSe Disc WTRU ID—Target Restricted ProSe App User ID).

At 1720, The ProSe Function 1707 may identify the users being revoked. Based on the number of users de-authorized, the ProSe Function 1707 may decide to allocate a new ProSe Code for the announcing WTRU 1702 to announce.

If the announcing WTRU 1702 is in the VPLMN 1730, the monitoring WTRU 1703 may request the ProSe function 1707 of the announcing WTRU 1702 for authorization for assigning a new ProSe code and the new ProSe code. The ProSe Function 1707 may send an announce authorization message 1722 to the ProSe Function 1704 in the VPLMN 1730. The announce authorization message 1722 may include, but is not limited to include: the Restricted ProSe App user ID; the Application ID; a validity timer; the ProSe Code; and/or the WTRU identity. The ProSe Function 1704 may respond to the ProSe Function 1707 by sending an Announce Authorization acknowledgement (ACK) message 1724.

The ProSe Function 1707 may send a discovery response message 1726, including a ProSe Code and/or validity timer, to the announcing WTRU 1702. At 1728, the announcing WTRU 1702 may start radio resource allocation in order to transmit the new ProSe code (if it was received) or to stop announcing a ProSe Code. The ProSe Function 1707 may inform the authorized monitoring WTRUs 1703 of the new code to monitor. Alternatively, the Monitoring WTRU may obtain the new code when the TTL of the previous allocated code expires.

At 1740, the ProSe Function 1707 may check which users/WTRUs are authorized to monitor the new code (by checking the authorized Discovery WTRU IDs from authorization response message 1718) and may retrieve the authorized codes to monitor. The ProSe Function 1707 may also check the WTRUs that are not authorized to monitor the previous codes (by checking the revoked Discovery WTRU IDs from authorization response message 1718).

At 1742, if the Discovery WTRU ID belongs to a different PLMN (e.g. VPLMN 1730), the ProSe Function 1707 may contact the ProSe Function 1704 that allocated the identity in order to retrieve the authorized ProSe codes to monitor. The ProSe Function 1707 may provide send a monitoring update message 1744 including updated Discovery Filters and/or TTL to authorized monitoring WTRU(s) 1703. For the revoked WTRUs, the ProSe Function 1707 may set the TTL of the ProSe code to zero.

According to an example, de-authorization of restricted discovery may be initiated by the ProSe Function. The ProSe Function may decide to revoke authorization for restricted discovery to certain WTRUs. The reasons, for example, may be that an Application may no longer be authorized to use restricted discovery in certain PLMNs, or that a user may revoke its subscription for restricted discovery (in the HSS).

Figure 18:
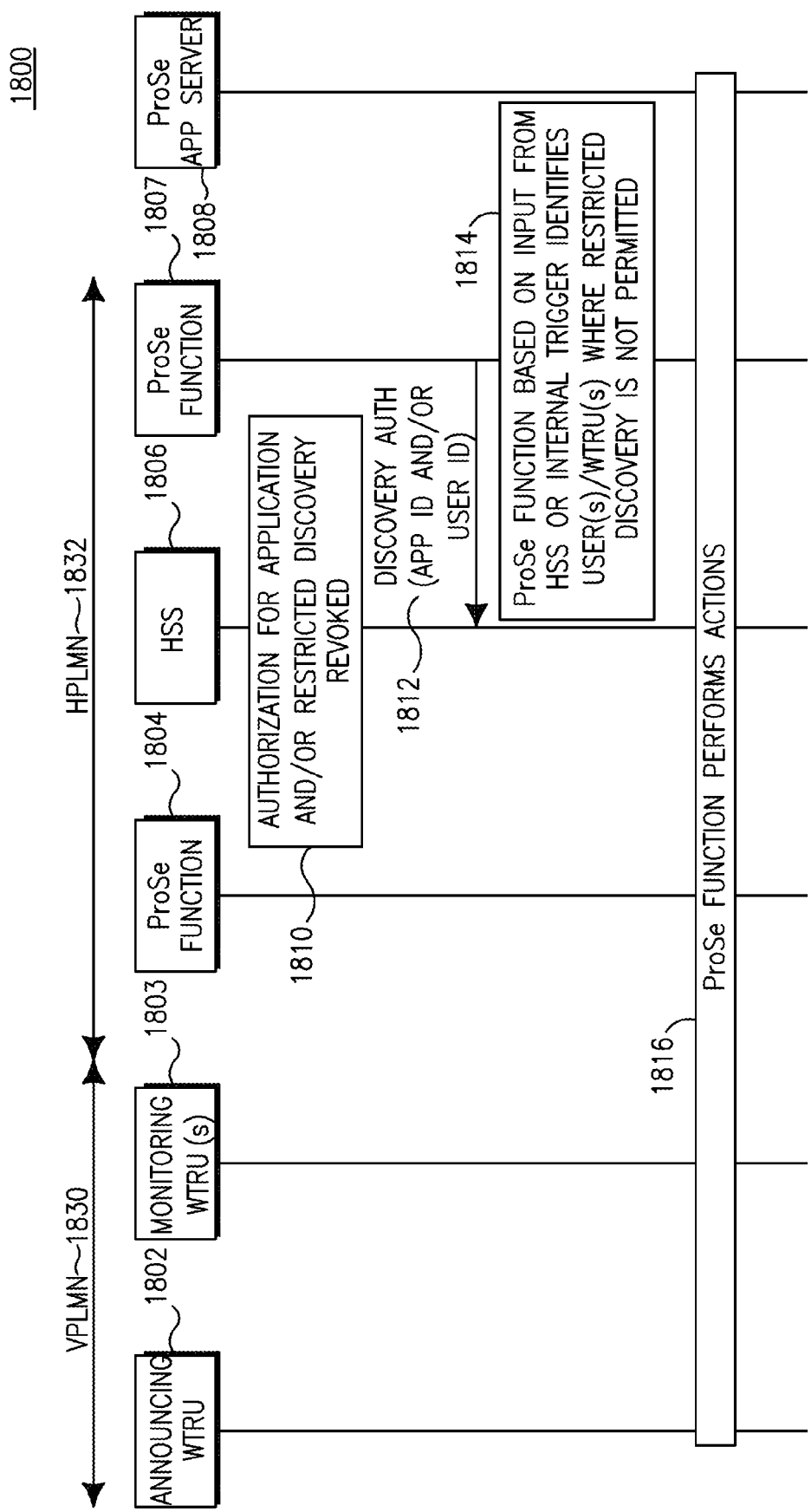
FIG. 18 is a flow diagram for another example restricted discovery revocation procedure.

FIG. 18 is a flow diagram for another example restricted discovery revocation procedure 1800. At 1810, changes in subscription details in the HSS 1806 trigger the HSS 1806 to inform the ProSe Function 1807. Thus, at 1812, the HSS 1806 may indicate to the ProSe Function 1807 the list of revoked users and/or applications. At 1814, the ProSe Function 1807 may identify, based on input from the HSS 1806 or from an internal trigger (e.g. when application authorization may be stored in the ProSe Function 1807), the list of users where restricted discovery may be not permitted. The ProSe Function 1807 may obtain the Discovery WTRU ID(s) and/or linked Restricted ProSe App User ID(s) of the revoked WTRU(s).

The remaining operations in 1816 may include any combination of operations described above for revocation of restricted discovery via the PC3 reference point as chosen by the ProSe Function 1807.

In the following, reject scenarios are described. For example, in the restricted discovery announce, monitor, and match procedure described above, the ProSe function may not always accept the discovery request from the Monitoring (discoveree) WTRU and Announcing (discoverer) WTRU in a model A (or model B) WTRU. If the discovery request is not accepted by the ProSe function, the ProSe function may send a reject message that may include the reason for rejection. The ProSe function may reject the restricted discovery request in any of the following scenarios.

In an example scenario, the WTRU may send a request with the discovery type not supported for a particular application or application layer user ID. For example, the WTRU may be authorized for model A restricted discovery for a particular restricted discovery application user ID, and it may send a request for model B restricted discovery request for that restricted discovery application user ID. The ProSe Function may reject the request with a reason specifying that the type of discovery request (Model A discovery versus Model B discovery) may not be supported for this restricted ProSe application user ID or the a reason that the application ID may be not authorized.

This reject scenario may apply for a monitoring WTRU and/or the announcing WTRU. In the case of monitoring WTRU, the discovery message may contain the announcing WTRU's restricted ProSe application layer ID in the application transparent container. If the monitoring WTRU is not authorized to monitor the restricted application layer User ID contained in the transparent container, the ProSe function may obtain the authorization reject message from the ProSe App Server on the PC2 interface. The ProSe server may send the reject message to the informing WTRU that target restricted application user ID may be not authorized.

In an example scenario, the monitoring WTRU may send a Match Report message to the ProSe function around the same time the announcing WTRU may have initiated the revocation procedure and before the monitoring WTRU receives updated discovery filters or an indication that the ProSe code has been revoked. In this case, the ProSe function may send the updated discovery filter or Discovery Monitoring update and/or send a Match Report Reject message with a reason stating that the discovery code has been revoked. In any of the above scenarios, the WTRU may stop monitoring the ProSe code associated with tis Restricted ProSe application ID.

In all the embodiments described above, the ProSe application code or ProSe code assigned by the ProSe Function may consist of two parts. One of which may be assigned by the ProSe Function and the second part of the ProSe code may be assigned by the Application Server. The application server may send the application specific part of the ProSe code to the ProSe Function during the ProSe Function-Application Server authorization procedure over the PC2 interface. When the monitoring UE sends a match report for the ProSe code, the ProSe Function may send a message to the ProSe Application server to get the translation of the application specific part of the ProSe Application code as it was assigned by the ProSe application server. This translation may be obtained as part of the Authorization Request/Authorization Response procedure between the ProSe Function and ProSe Application Server as part of the Match report procedure.

During the Match report procedure or after the match report, the Monitoring WTRU may receive the Match report Acknowledgement with the target restricted ProSe App User ID. The monitoring WTRU may contact the ProSe Application server directly over the PC1 interface to get the translation of the Application specific part of the ProSe Code. The monitoring WTRU may send the complete ProSe code to the App Server or the application part of the ProSe code to get the mapping back from the application server.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A discoverer wireless transmit/receive unit (WTRU) configured for Model B proximity services (ProSe) discovery, the discoverer WTRU comprising:
    a transmitter configured to send a discovery request to a ProSe function, wherein the discovery request includes at least a WTRU identity, a command, and an application identity (ID);
    a receiver configured to receive a discovery response from the ProSe function including a first ProSe code for the discoverer WTRU and at least one associated discovery filter;
    the transmitter configured to transmit the first ProSe code on a PC5 interface;
    the receiver configured to receive, from a discoveree WTRU, on the PC5 interface a second ProSe code in response to the transmission of the first ProSe code;
    a processor configured to use the at least one associated discovery filter to detect a match with the second ProSe code, wherein the detecting a match includes a bitwise AND operation of a mask associated with the at least one associated filter and the second ProSe code; and
    on a condition that a match is detected, the transmitter configured to send a match report to the ProSe function.

2. The discoverer WTRU of claim 1, wherein the discovery request further includes a restricted ProSe Application identity (ID).

3. The discoverer WTRU of claim 1, wherein the at least one associated discovery filter includes at least one validity timer associated with the first ProSe code.

4. The discoverer WTRU of claim 1, wherein the ProSe function is in a home public land mobile network (HPLMN) of the discoverer WTRU.

5. A discoveree wireless transmit/receive unit (WTRU) configured for Model B proximity services (ProSe) discovery, the discoveree WTRU comprising:
- a transmitter configured to send a discovery request to a ProSe function, wherein the discovery request includes at least a WTRU identity, a command, and an application identity (ID);
- a receiver configured to receive a discovery response from the ProSe function including a linked ProSe code for the discoveree WTRU and at least one associated discovery filter;
- the receiver configured to receive, from a discoverer WTRU, a first ProSe code on a PC5 interface;
- a processor configured to use the at least one associated discovery filter to detect a match with the first ProSe code, wherein the detecting a match includes a bitwise AND operation of a mask associated with the at least one associated filter and the first ProSe code; and
- on a condition that a match is detected, the transmitter configured to send the linked ProSe code on the PC5 interface.

6. The discoveree WTRU of claim 5, wherein the at least one associated discovery filter includes at least one validity timer associated with the first ProSe code.

7. The discoveree WTRU of claim 5, wherein the ProSe function is in a home public land mobile network (HPLMN) of the discoveree WTRU.

8. A method for Model B proximity services (ProSe) discovery performed by a discoverer wireless transmit/receive unit (WTRU), the method comprising:
- sending a discovery request to a ProSe function, wherein the discovery request includes at least a WTRU identity, a command, and an application identity (ID);
- receiving a discovery response from the ProSe function including a first ProSe code for the discoverer WTRU and at least one associated discovery filter;
- transmit the first ProSe code on a PC5 interface;
- receiving, from a discoveree WTRU, on the PC5 interface a second ProSe code in response to the transmission of the first ProSe code;
- using the at least one associated discovery filter to detect a match with the second ProSe code, wherein the detecting a match includes a bitwise AND operation of a mask associated with the at least one associated filter and the second ProSe code; and
- on a condition that a match is detected, sending a match report to the ProSe function.

9. The method of claim 8, wherein the discovery request further includes a restricted ProSe Application identity (ID).

10. A method for Model B proximity services (ProSe) discovery performed by a discoveree wireless transmit/receive unit (WTRU), the method comprising:
- sending a discovery request to a ProSe function, wherein the discovery request includes at least a WTRU identity, a command, and an application identity (ID);
- receiving a discovery response from the ProSe function including a linked ProSe code for the discoveree WTRU and at least one associated discovery filter;
- receiving, from a discoverer WTRU, a first ProSe code on a PC5 interface;
- using the at least one associated discovery filter to detect a match with the first ProSe code, wherein the detecting a match includes a bitwise AND operation of a mask associated with the at least one associated filter and the first ProSe code; and
- on a condition that a match is detected, sending the linked ProSe code on the PC5 interface.

11. The method of claim 10, wherein the at least one associated discovery filter includes at least one validity timer associated with the first ProSe code.

* * * * *